US012645524B2

(12) United States Patent　　　(10) Patent No.:　US 12,645,524 B2

Christensen et al.　　　(45) Date of Patent:　Jun. 2, 2026

(54) AUTOMATED ROOT CAUSE ANALYSIS OF ANOMALIES

(71) Applicant: Microsoft Technology Licensing, LLC, Redmond, WA (US)

(72) Inventors: Jens Enzo Nyby Christensen, Bothell, WA (US); Gregory Santos Tiu, Redmond, WA (US); Mengyuan Zhang, Clemson, SC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 18/617,725

(22) Filed: Mar. 27, 2024

(65) Prior Publication Data

US 2025/0307056 A1　　Oct. 2, 2025

(51) Int. Cl.
　G06F 11/00　　(2006.01)
　G06F 11/07　　(2006.01)
　G06N 20/00　　(2019.01)
(52) U.S. Cl.
　CPC ........ G06F 11/079 (2013.01); G06F 11/0736 (2013.01); G06N 20/00 (2019.01)
(58) Field of Classification Search
　CPC .............. G06F 11/079; G06F 11/0751; G06F 11/3006; G06F 11/0787; G06F 11/0709; G06N 20/00
See application file for complete search history.

(56) References Cited

U.S. PATENT DOCUMENTS

| | | | |
|---|---|---|---|
| 9,122,602 | B1 * | 9/2015 | Jewell ................. H04L 41/0631 |
| 11,675,799 | B2 * | 6/2023 | Pierri ................... G06F 11/3409 |
| | | | 714/37 |
| 2017/0200088 | A1 * | 7/2017 | Yang ..................... H04W 24/04 |

(Continued)

FOREIGN PATENT DOCUMENTS

EP　　　　4075277 A1　　10/2022

OTHER PUBLICATIONS

Invitation to pay additional search fee Received in PCT Application No. PCT/US2025/014688, mailed on Jun. 23, 2025, 15 pages.

(Continued)

*Primary Examiner* — Jonathan D Gibson
(74) *Attorney, Agent, or Firm* — NovoTechIP International PLLC

(57)　　　　　ABSTRACT

A data processing system implements performing a root cause analysis that includes identifying a first anomalous signal data predictive of a root cause of a first anomaly in signal data received from a computing system, analyzing the sub-signals of the first anomalous signal data to generate labeled training data, training a gradient boosted tree model using the labeled training data, generating a decision tree based approximating a predictive performance of the gradient boosted tree model, determining insights data predictive of the root cause of the first anomaly based on the gradient boosted tree model and the decision tree, aggregating the insights and analyzing the aggregated insights data to determine a predicted root cause for the first anomaly, determining a confidence level associated with the predicted root cause, and categorizing the predicted root cause into one of a plurality of categories based on the confidence level.

17 Claims, 27 Drawing Sheets

(56) References Cited

U.S. PATENT DOCUMENTS

| | | | |
|---|---|---|---|
| 2017/0212829 A1 | | 7/2017 | Bales |
| 2019/0294484 A1* | | 9/2019 | Luo ........................ G06N 20/00 |
| 2019/0347148 A1* | | 11/2019 | Gomes Pereira ... G06F 11/3466 |
| 2021/0136098 A1 | | 5/2021 | Stergioudis et al. |
| 2021/0406148 A1* | | 12/2021 | Bertran ............... G06F 11/0709 |
| 2022/0334904 A1* | | 10/2022 | Chesneau ........... G06F 11/0793 |
| 2023/0004487 A1* | | 1/2023 | Bitla ................... G06F 11/3466 |
| 2023/0016199 A1* | | 1/2023 | Jividen ................. H04L 41/064 |
| 2023/0061280 A1 | | 3/2023 | Rohrkemper |
| 2023/0316109 A1* | | 10/2023 | Korst ........................ G06N 7/01 |
| | | | 706/45 |
| 2023/0367668 A1* | | 11/2023 | Oglesby ............. G06F 11/0793 |
| 2023/0401114 A1* | | 12/2023 | Balasubramanian ........................ |
| | | | G06F 11/079 |
| 2024/0020191 A1* | | 1/2024 | Harutyunyan ...... G06F 11/3409 |
| 2024/0118965 A1* | | 4/2024 | Ashrafi ................. G06F 11/079 |
| 2024/0168857 A1* | | 5/2024 | Ahuja ................. G06F 11/3409 |
| 2024/0220352 A1* | | 7/2024 | Casati ................. G06F 11/3447 |
| 2025/0307056 A1* | | 10/2025 | Christensen ............. G06N 3/08 |

OTHER PUBLICATIONS

International Search Report and Written Opinion received in PCT Application No. PCT/US2025/014688, mailed on Aug. 13, 2025, 22 pages.

* cited by examiner

Example Prompt:

A metric portal has detected an anomaly in a technical metric. The technical metric is called METRIC-A. A Root Cause Analysis algorithm was applied to the underlying data and the output was as follows:

The various features that were found to have the highest importance scores is represented here (comma "," separated) as well as their importance score (after the colon ":", on a scale of 0-1): FEATURE-A: 0.45, FEATURE-B: 0.41, FEATURE-C: 0.1, FEATURE-D: 0.002

Other output data from the Root Cause Analysis algorithm was that these sub-metrics, if removed from the signal, managed to bring the signal down to a level which made it not trigger an anomaly alert: FEATURE-B

These features were found partially reduce the anomaly impact: FEATURE-A

These features had no impact on reducing the anomaly when removed from the signal: FEATURE-C, FEATURE-D, FEATURE-E, FEATURE-F

Write a helpful neutral message to a non-technical user that describes how to interpret the likely cause of the anomaly identified in the current analyzed signal. The message should be between 310 and 340 characters long. It should refer to the name of the features you deem to bare a likely causal relationship to the anomaly already detected. The message should not include any specific numbers from the analysis. Interpret all the data as a whole. Also write a short title for the message of between 20-50 characters that summarize the insights.

432

Example Output:

Title: Key Causes of Anomaly Detected

*Message: Our analysis identified FEATURE-B as the primary factor influencing the recent anomaly in METRIC-A. Additionally, FEATURE-A also contributed to the anomaly but to a lesser extent. Removing FEATURE-B from the signal effectively normalized the metrics, suggesting its significant role.*

Figure 4N:
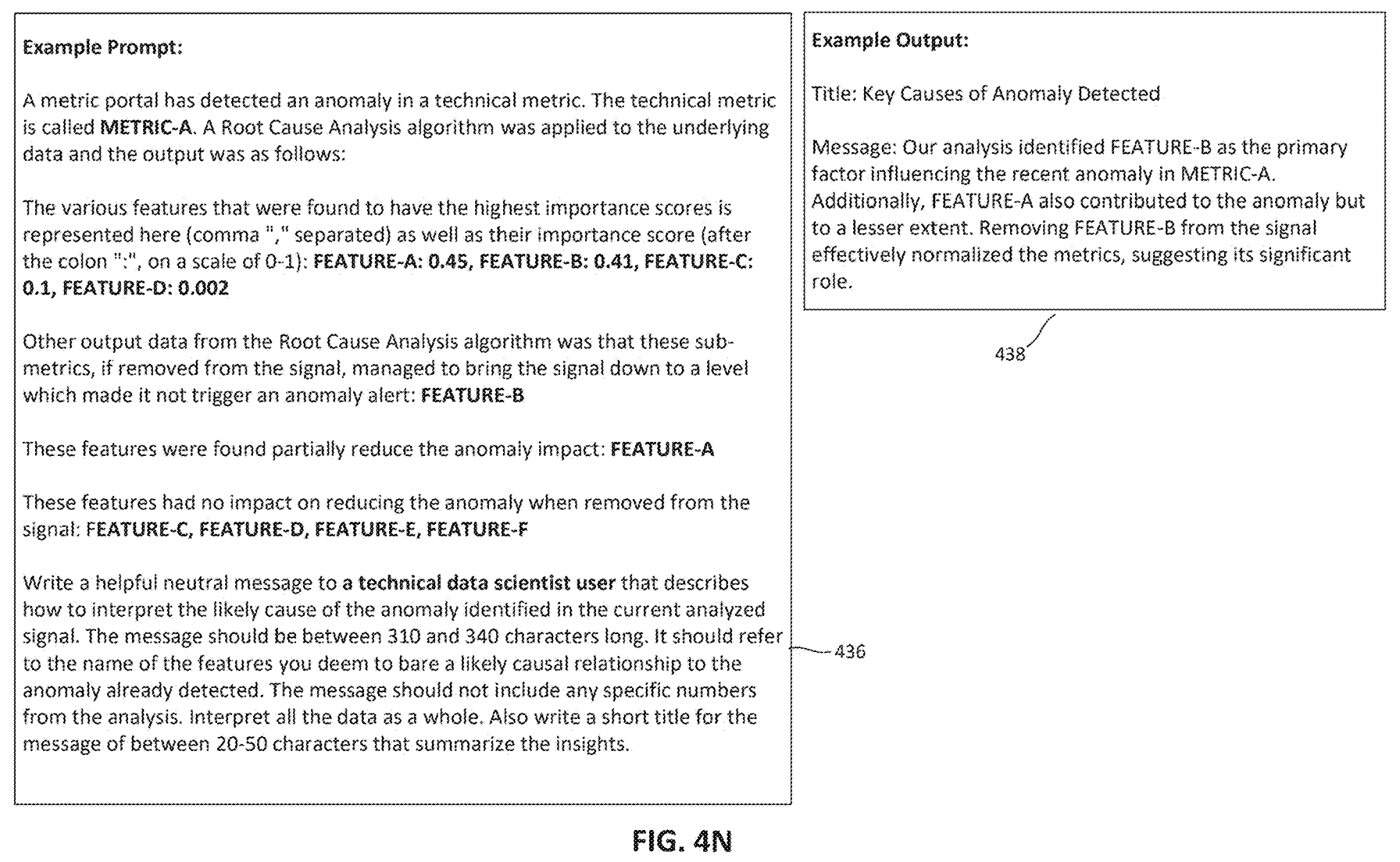

Example Prompt:

A metric portal has detected an anomaly in a technical metric. The technical metric is called METRIC-A. A Root Cause Analysis algorithm was applied to the underlying data and the output was as follows:

The various features that were found to have the highest importance scores is represented here (comma "," separated) as well as their importance score (after the colon ":", on a scale of 0-1): FEATURE-A: 0.45, FEATURE-B: 0.41, FEATURE-C: 0.1, FEATURE-D: 0.002

Other output data from the Root Cause Analysis algorithm was that these sub-metrics, if removed from the signal, managed to bring the signal down to a level which made it not trigger an anomaly alert: FEATURE-B

These features were found partially reduce the anomaly impact: FEATURE-A

These features had no impact on reducing the anomaly when removed from the signal: FEATURE-C, FEATURE-D, FEATURE-E, FEATURE-F

Write a helpful neutral message to a technical data scientist user that describes how to interpret the likely cause of the anomaly identified in the current analyzed signal. The message should be between 310 and 340 characters long. It should refer to the name of the features you deem to bare a likely causal relationship to the anomaly already detected. The message should not include any specific numbers from the analysis. Interpret all the data as a whole. Also write a short title for the message of between 20-50 characters that summarize the insights.

436

Example Output:

Title: Key Causes of Anomaly Detected

Message: Our analysis identified FEATURE-B as the primary factor influencing the recent anomaly in METRIC-A. Additionally, FEATURE-A also contributed to the anomaly but to a lesser extent. Removing FEATURE-B from the signal effectively normalized the metrics, suggesting its significant role.

Figure 4P:
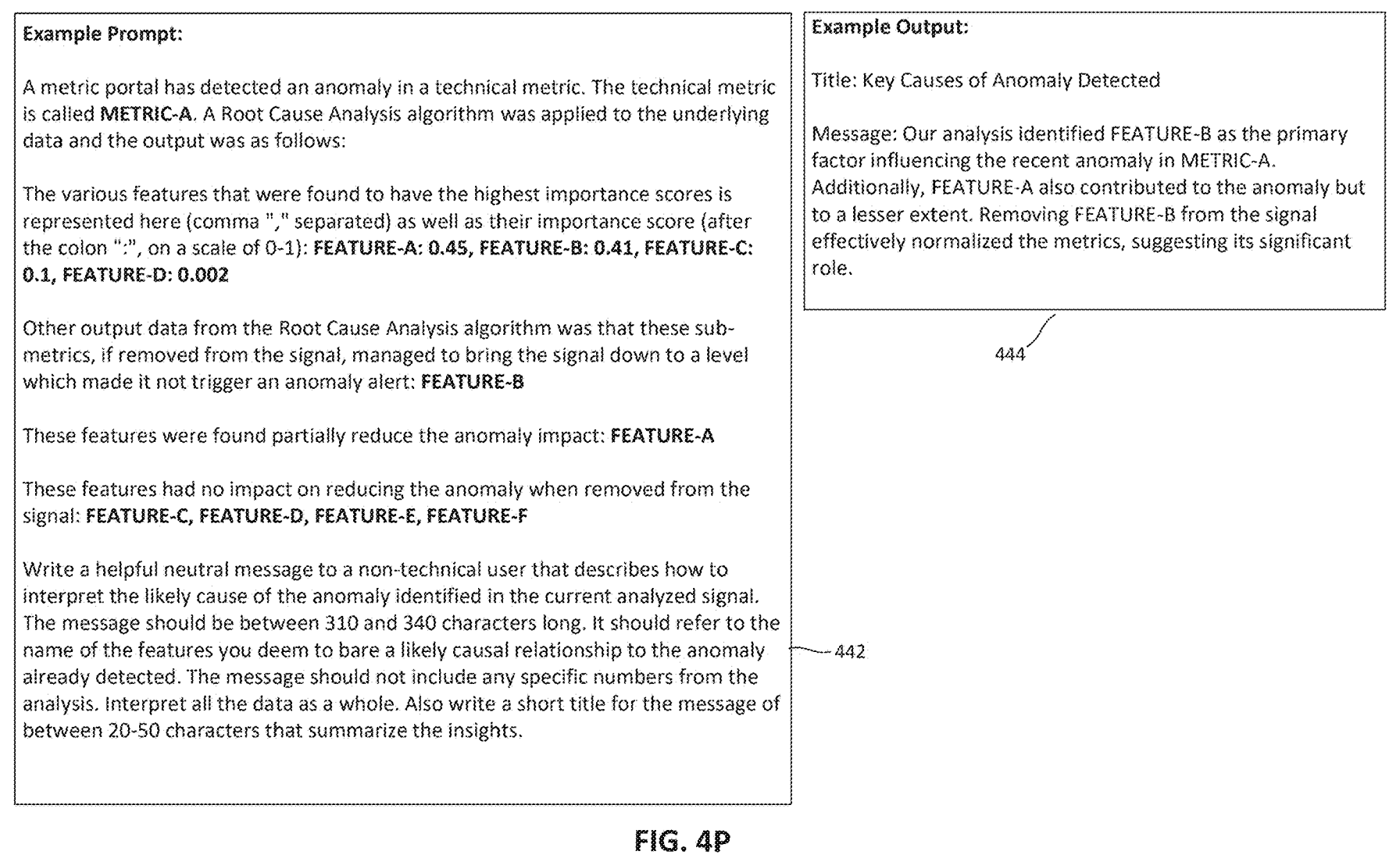

Example Output:

Title: Key Causes of Anomaly Detected

Message: Our analysis identified FEATURE-B as the primary factor influencing the recent anomaly in METRIC-A. Additionally, FEATURE-A also contributed to the anomaly but to a lesser extent. Removing FEATURE-B from the signal effectively normalized the metrics, suggesting its significant role.

444

Example Prompt:

A metric portal has detected an anomaly in a technical metric. The technical metric is called METRIC-A. A Root Cause Analysis algorithm was applied to the underlying data and the output was as follows:

The various features that were found to have the highest importance scores is represented here (comma "," separated) as well as their importance score (after the colon ":", on a scale of 0-1): FEATURE-A: 0.45, FEATURE-B: 0.41, FEATURE-C: 0.1, FEATURE-D: 0.002

Other output data from the Root Cause Analysis algorithm was that these sub-metrics, if removed from the signal, managed to bring the signal down to a level which made it not trigger an anomaly alert: FEATURE-B

These features were found partially reduce the anomaly impact: FEATURE-A

These features had no impact on reducing the anomaly when removed from the signal: FEATURE-C, FEATURE-D, FEATURE-E, FEATURE-F

Write a helpful neutral message to a non-technical user that describes how to interpret the likely cause of the anomaly identified in the current analyzed signal. The message should be between 310 and 340 characters long. It should refer to the name of the features you deem to bare a likely causal relationship to the anomaly already detected. The message should not include any specific numbers from the analysis. Interpret all the data as a whole. Also write a short title for the message of between 20-50 characters that summarize the insights.

Figure 4R:
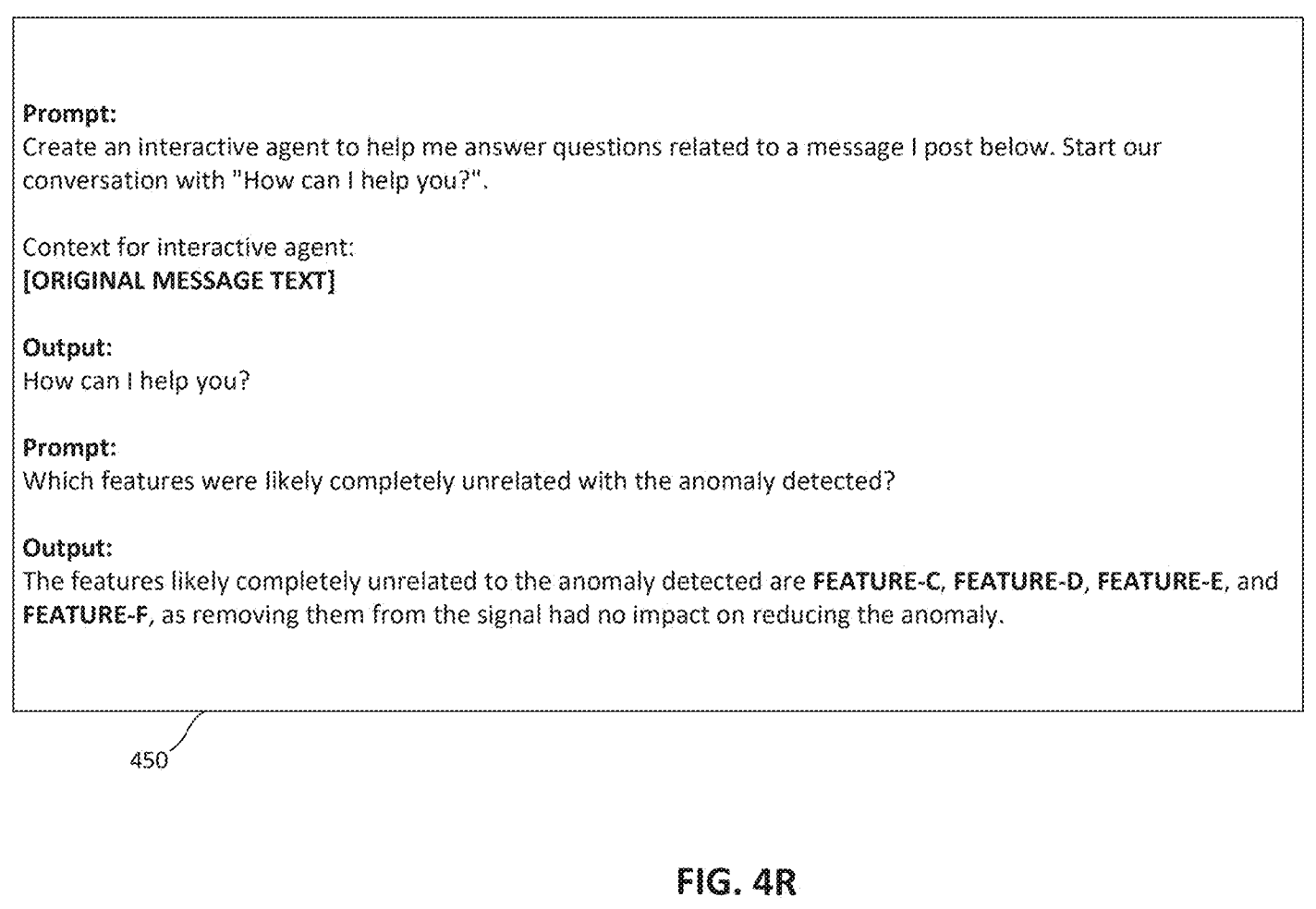

Prompt:
Create an interactive agent to help me answer questions related to a message I post below. Start our conversation with "How can I help you?".

Context for interactive agent:
[ORIGINAL MESSAGE TEXT]

Output:
How can I help you?

Prompt:
Which features were likely completely unrelated with the anomaly detected?

Output:
The features likely completely unrelated to the anomaly detected are FEATURE-C, FEATURE-D, FEATURE-E, and FEATURE-F, as removing them from the signal had no impact on reducing the anomaly.

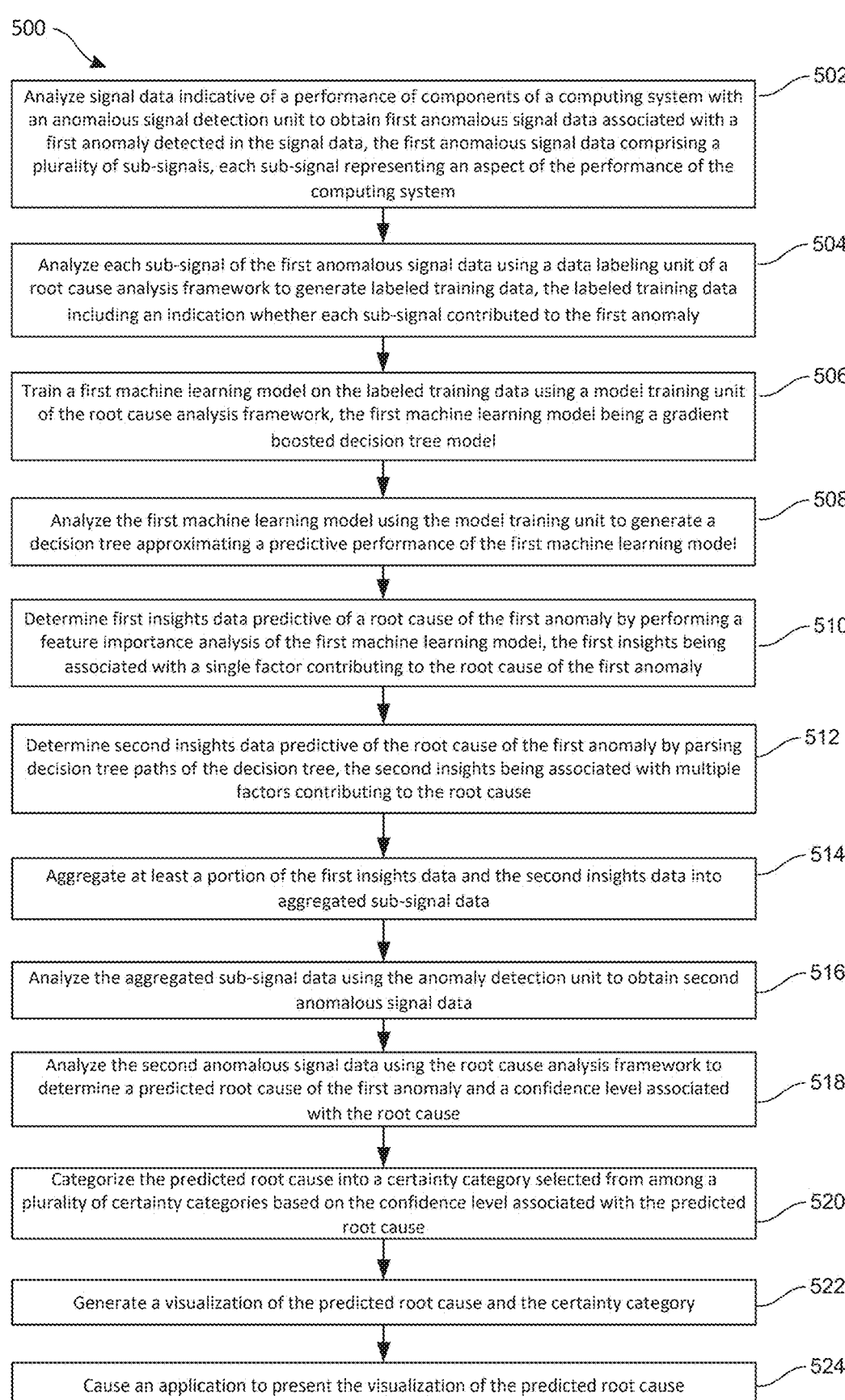

502 — Analyze signal data indicative of a performance of components of a computing system with an anomalous signal detection unit to obtain first anomalous signal data associated with a first anomaly detected in the signal data, the first anomalous signal data comprising a plurality of sub-signals, each sub-signal representing an aspect of the performance of the computing system 504 — Analyze each sub-signal of the first anomalous signal data using a data labeling unit of a root cause analysis framework to generate labeled training data, the labeled training data including an indication whether each sub-signal contributed to the first anomaly 506 — Train a first machine learning model on the labeled training data using a model training unit of the root cause analysis framework, the first machine learning model being a gradient boosted decision tree model 508 — Analyze the first machine learning model using the model training unit to generate a decision tree approximating a predictive performance of the first machine learning model 510 — Determine first insights data predictive of a root cause of the first anomaly by performing a feature importance analysis of the first machine learning model, the first insights being associated with a single factor contributing to the root cause of the first anomaly 512 — Determine second insights data predictive of the root cause of the first anomaly by parsing decision tree paths of the decision tree, the second insights being associated with multiple factors contributing to the root cause 514 — Aggregate at least a portion of the first insights data and the second insights data into aggregated sub-signal data 516 — Analyze the aggregated sub-signal data using the anomaly detection unit to obtain second anomalous signal data 518 — Analyze the second anomalous signal data using the root cause analysis framework to determine a predicted root cause of the first anomaly and a confidence level associated with the root cause 520 — Categorize the predicted root cause into a certainty category selected from among a plurality of certainty categories based on the confidence level associated with the predicted root cause 522 — Generate a visualization of the predicted root cause and the certainty category 524 — Cause an application to present the visualization of the predicted root cause

FIG. 5A

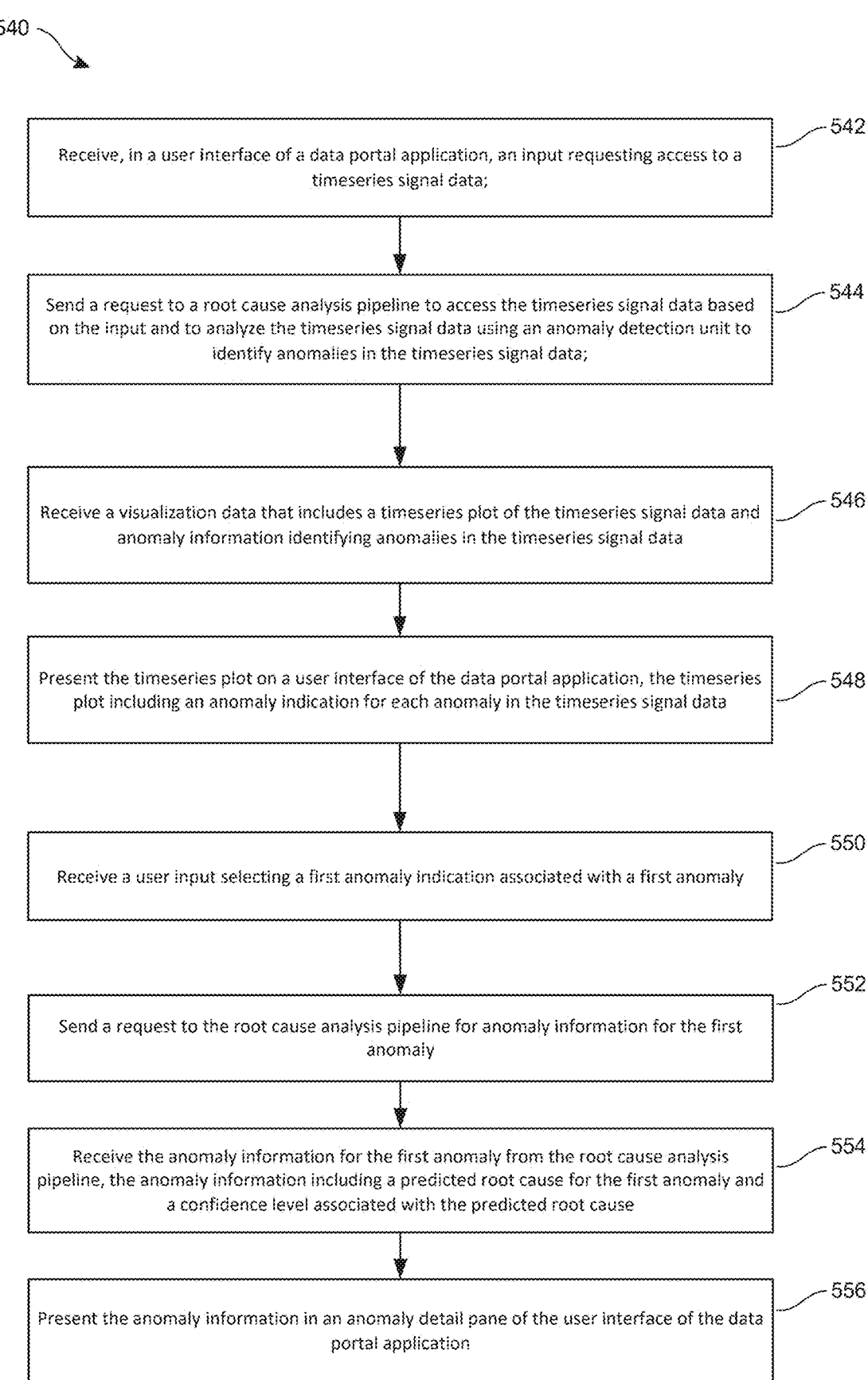

540

542
Receive, in a user interface of a data portal application, an input requesting access to a timeseries signal data;

544
Send a request to a root cause analysis pipeline to access the timeseries signal data based on the input and to analyze the timeseries signal data using an anomaly detection unit to identify anomalies in the timeseries signal data;

546
Receive a visualization data that includes a timeseries plot of the timeseries signal data and anomaly information identifying anomalies in the timeseries signal data 548
Present the timeseries plot on a user interface of the data portal application, the timeseries plot including an anomaly indication for each anomaly in the timeseries signal data 550
Receive a user input selecting a first anomaly indication associated with a first anomaly 552
Send a request to the root cause analysis pipeline for anomaly information for the first anomaly 554
Receive the anomaly information for the first anomaly from the root cause analysis pipeline, the anomaly information including a predicted root cause for the first anomaly and a confidence level associated with the predicted root cause 556
Present the anomaly information in an anomaly detail pane of the user interface of the data portal application

FIG. 5B

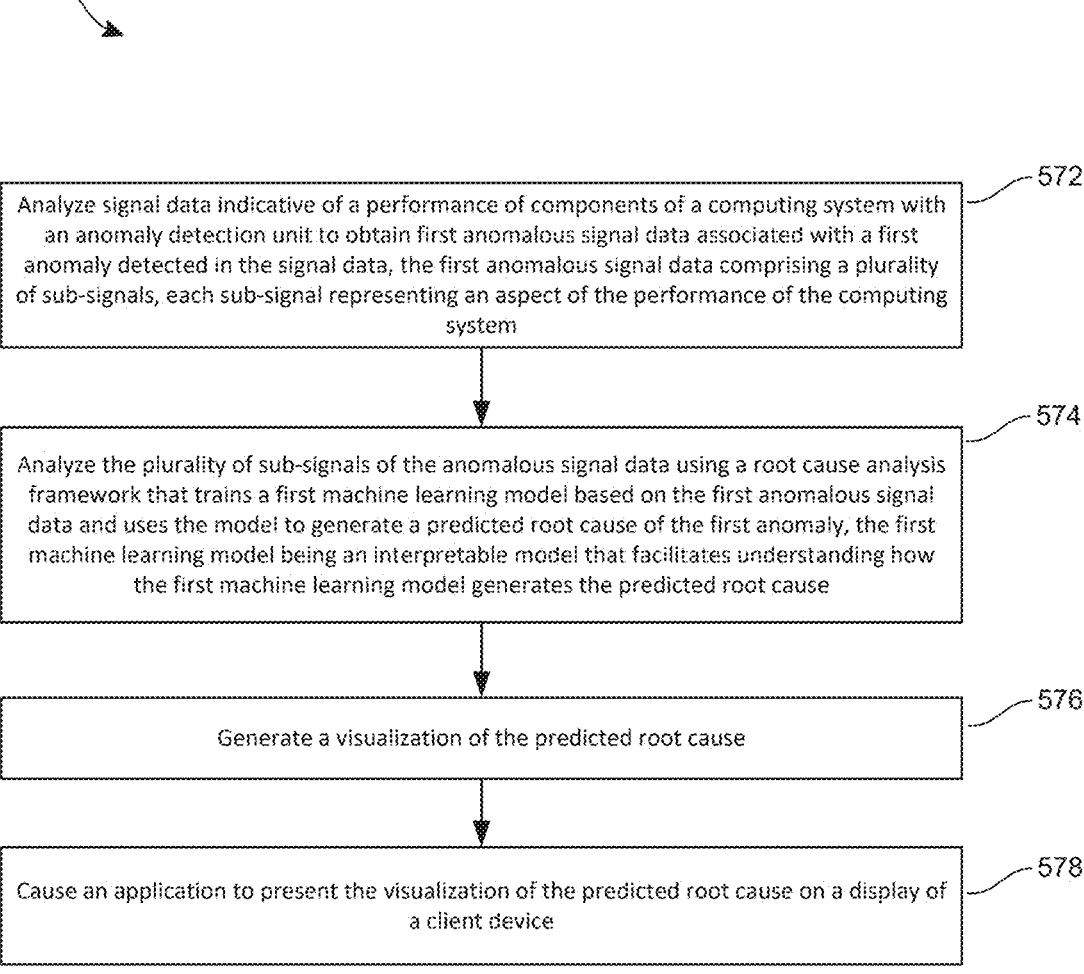

570

572

Analyze signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system

574

Analyze the plurality of sub-signals of the anomalous signal data using a root cause analysis framework that trains a first machine learning model based on the first anomalous signal data and uses the model to generate a predicted root cause of the first anomaly, the first machine learning model being an interpretable model that facilitates understanding how the first machine learning model generates the predicted root cause

576

Generate a visualization of the predicted root cause

578

Cause an application to present the visualization of the predicted root cause on a display of a client device

FIG. 5C

AUTOMATED ROOT CAUSE ANALYSIS OF ANOMALIES

BACKGROUND

Modern computing environments include numerous software and/or hardware components that can experience faults that need to be diagnosed and corrected. Engineers attempting to diagnose and correct such faults need to understand the underlying causes behind the faults in order to remedy them. Most modern computing environments generate telemetry data comprising complex timeseries signals that can be analyzed in an attempt to detect anomalies in the behavior of components of the computing environment and to determine the underlying causes of these anomalies. However, existing systems often stop at detection, leaving a gap in knowledge that hinders effective troubleshooting and decision-making. For instance, in an online service, understanding the root cause of an anomaly in recorded user experience could greatly help in the troubleshooting time and effort by engineers. Hence, there is a need for improved systems and methods that provide means for accurately detecting anomalies in a computing environment, determining the root cause of the anomalies, and providing interpretable descriptions of the root cause that can be used by engineers to remedy these problems.

SUMMARY

An example data processing system according to the disclosure includes a processor and a memory storing executable instructions. The instructions when executed cause the processor alone or in combination with other processors to perform operations including analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system; analyzing the plurality of sub-signals of the anomalous signal data using a root cause analysis framework that trains a first machine learning model based on the first anomalous signal data and uses the model to generate a predicted root cause of the first anomaly, the first machine learning model being an interpretable model that facilitates understanding how the first machine learning model generates the predicted root cause; generating a visualization of the predicted root cause; and causing an application to present the visualization of the predicted root cause on a display of a client device.

An example method implemented in a data processing system includes analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system; analyzing the plurality of sub-signals of the anomalous signal data using a root cause analysis framework that trains a first machine learning model based on the first anomalous signal data and uses the model to generate a predicted root cause of the first anomaly, the first machine learning model being an interpretable model that facilitates understanding how the first machine learning model generates the predicted root cause; generating a visualization of the predicted root cause; and causing an application to present the visualization of the predicted root cause on a display of a client device.

An example data processing system according to the disclosure includes a processor and a memory storing executable instructions. The instructions when executed cause the processor alone or in combination with other processors to perform operations including receiving, in a user interface of a data portal application, an input requesting access to a timeseries signal data; sending a request to a root cause analysis pipeline to access the timeseries signal data based on the input and to analyze the timeseries signal data using an anomaly detection unit to identify anomalies in the timeseries signal data; receiving a visualization data that includes a timeseries plot of the timeseries signal data and anomaly information identifying anomalies in the timeseries signal data; presenting the timeseries plot on a user interface of the data portal application, the timeseries plot including an anomaly indication for each anomaly in the timeseries signal data; receiving a user input selecting a first anomaly indication associated with a first anomaly; sending a request to the root cause analysis pipeline for anomaly information for the first anomaly; receiving the anomaly information for the first anomaly from the root cause analysis pipeline, the anomaly information including a predicted root cause for the first anomaly and a confidence level associated with the predicted root cause; and presenting the anomaly information in an anomaly detail pane of the user interface of the data portal application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5A is a flow chart of an example process for performing root cause analysis according to the techniques disclosed herein.

FIG. 5B is a flow chart of another example process for performing root cause analysis according to the techniques disclosed herein.

FIG. 5C is a flow chart of another example process for performing root cause analysis according to the techniques disclosed herein.

DETAILED DESCRIPTION

Figure 1:
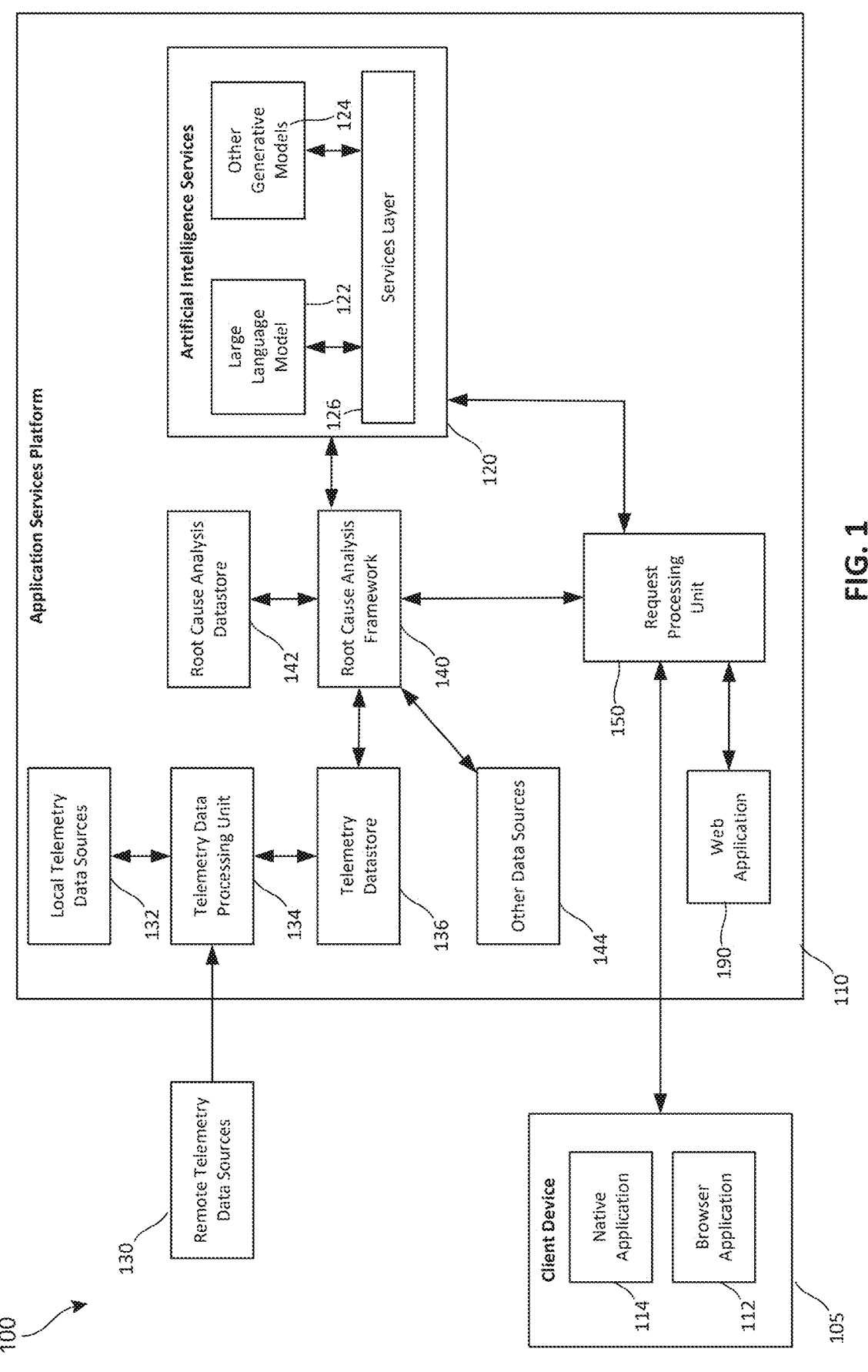
FIG. 1 is a diagram of an example computing environment in which the techniques described herein are implemented.

Systems and methods for automated root cause analysis of anomalies are provided herein. These techniques provide a technical solution to the problems with current systems which provide anomaly detection but fail to provide root cause analysis of the underlying causes of the anomalies. The techniques herein provide means for accurately detecting anomalies in a computing environment, determining the root cause of the anomalies, and providing interpretable descriptions of the root cause that can be used by engineers to remedy the underlying problems causing the anomalies.

The techniques herein provide a multi-stage root cause analysis framework that integrates anomaly detection with advanced correlation analysis to determine the root cause of detected anomalies. The framework initially identifies anomalies in aggregated timeseries signals and conducts validation tests on these signals to ensure the practical significance of these signals. The framework then analyzes leaf-level signal data by applying a boosted tree-based model to extract predictive features from the signal data and utilizes Shapley Additive exPlanations (SHAP) values to analyze the contribution of these signals. A technical benefit of this approach is that the SHAP values provide a consistent, accurate, and objective explanation of how each feature of the input to the model impacts the model's predictions. Consequently, the signal data can be organized into transparent decision tree, which enables the framework to provide human-interpretable results to users to better understand the root cause of anomalies.

Another technical benefit of the techniques provided herein is integrated detection and understanding of anomalies and their associated root causes. These techniques go beyond mere detection of anomalies and generate insights into why the anomalies have occurred. Another technical benefit of these techniques is efficiency and accuracy of these insights. These techniques utilize boosted ensemble tree-based method, which ensures high predictive accuracy, resilience to overfitting, and reduced variance. Yet another technical benefit of these techniques is interpretability through the use of decision tree representations. The techniques herein bridge the gap between robust machine learning models and human understanding, in contrast with the black box models that lack the transparency that facilitates such human understanding. The techniques herein provide a versatile solution that can be applied to various domains where timeseries analysis is crucial, such as but not limited to software and computing services, finance, healthcare, and/or manufacturing. Yet another technical benefit of the techniques provided herein is resource optimization. These techniques make strategic use of ensemble-pruning and rule extraction which minimizes computational demands without sacrificing performance, which facilitates the use of these techniques across a wide variety of platforms, including resource constrained environments. These and other technical benefits of the techniques disclosed herein will be evident from the discussion of the example implementations that follow.

FIG. 1 is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools for collaboratively creating visual representations of information, and other applications for consuming and/or creating electronic content. The client device 105 and the application services platform 110 communicate with each other over a network (not shown). The network may be a combination of one or more public and/or private networks and may be implemented at least in part by the Internet.

The application services platform 110 includes a request processing unit 150, artificial intelligence (AI) services 120, a web application 190, a root cause analysis framework 140, a root cause analysis datastore 142, a telemetry data processing unit 134, a telemetry datastore 136, local telemetry data sources 132, and other data sources 144. The request processing unit 150 is configured to receive requests from an application implemented by the native application 114 of the client device 105, the browser application 112, and/or the web application 190 of the application services platform 110. The requests may include but are not limited to requests to generate new content, modify existing content, and/or perform other actions as discussed in the examples which follow. The requests may also include requests to perform a root cause analysis of anomalies according to the techniques provided herein. In other implementations, at least a portion of this functionality is implemented by the native application 114 of the client device 105. The request processing unit 150 also coordinates communication and exchange of data among components of the application services platform 110 as discussed in the examples which follow.

The application services platform 110 obtains telemetry data from the local telemetry data sources 132, the remote telemetry data sources 130, or both. The local telemetry data sources 132 are software and/or hardware components of the application services platform 110. The remote telemetry data sources 130 are software and/or hardware components of computing environments that are remote from the application services platform 110 that provide services to users of the application services platform 110. For instance, the remote telemetry data sources 130 can include one or more client devices, such as the client device 105, which can be used to access services provided by the application services platform 110. The telemetry data includes complex timeseries signals that can be analyzed by the root cause analysis framework 140 in an attempt to detect anomalies in the behavior of hardware and/or software components of the local telemetry data sources 132, the remote telemetry data sources 130, or both, and to determine the underlying causes of these anomalies. A technical benefit of using timeseries signals is that changes in the behavior of hardware and/or software components of the local telemetry data sources 132 and/or the remote telemetry data sources 130 over time can be detected based on changes in the telemetry signals generated by these components. Additional details of the telemetry data and the root cause analysis framework 140 are provided in the examples which follow.

The other data source 144 include additional data associated with the hardware and/or software components being monitored, such as configuration parameters, program code, and/or other data associated with these components. The other data sources 144 are stored in a persistent memory of the application services platform 110 and can be queried by the root cause analysis framework 140 to obtain information that can be used to identify a root cause for an anomaly and/or to generate a proposed solution to the anomaly.

The telemetry data processing unit 134 receives telemetry data from the local telemetry data sources 132, the remote telemetry data sources 130, or both. The telemetry data processing unit 134 stores the received telemetry data in the telemetry datastore 136. The telemetry datastore 136 is a persistent datastore in a memory of the application services platform 110. The telemetry datastore 136 is configured to enable the root cause analysis framework 140 and/or other components of the application services platform 110 to access and/or query the telemetry data stored in the telemetry datastore 136. In some implementations, the telemetry data processing unit 134 processes the telemetry data received from the local telemetry data sources 132 and/or the remote telemetry data sources 130 to normalize data value and/or to format the telemetry data according to a standardize format that facilitates analysis of the telemetry data by the root cause analysis framework 140 and/or other components of the application services platform 110.

The AI services 120 provide various machine learning models that analyze and/or generate content. The AI services 120 include a large language model (LLM) 122 in the example implementation shown in FIG. 1. Some instances of the AI services 120 include other generative models 124, which may include but are not limited to models configured to generate textual content, image content, video content, and/or other types of content in response to a prompt. The LLM 122 and the other generative models 124 provide services to the various components of the application services platform 110.

The LLM 122 is a generative language model that is configured to receive a textual prompt and to generate textual content in response to the textual prompt. The LLM 122 is a Generative Pre-trained Transformer (GPT) model in some implementations, such as but not limited to a GPT-3 or GPT-4 model. Other LLMs can also be used to implement the LLM 122. As discussed in the examples which follow, the root cause analysis framework 140 can utilize the LLM 122 to generate content related to root cause analysis in some implementations.

The services layer 126 receives requests to present a prompt to the models of the AI services 120 from the request processing unit 150 and/or the root cause analysis framework 140. The prompts include natural language prompts entered by a user of the native application 114 or the web application 190. The prompts also include prompts generated by components of the root cause analysis framework 140. Additional details of the prompt construction are described in detail in the examples which follow. The services layer 126 formats the natural language prompts in a format that is recognized by each of the models in some implementations. The services layer 126 also routes any content generated by the models to the source of the request, which includes the root cause analysis framework 140 or the request processing unit 150.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, which in some implementations, implements a root cause analysis application. Example user interfaces of such but not limited to a root cause analysis application are provided in FIGS. 4A-4R, which are described in detail in the examples which follow. The browser application 112 can be used for accessing and viewing web-based content provided by the application services platform 110. In such implementations, the application services platform 110 implements one or more web applications, such as the web application 190. The web application can implement the root cause application shown in FIGS. 4A-4R in some implementations. The application services platform 110 supports both the native application 114 and a web application 190 in some implementations, and the users may choose which approach best suits their needs.

Figure 2:
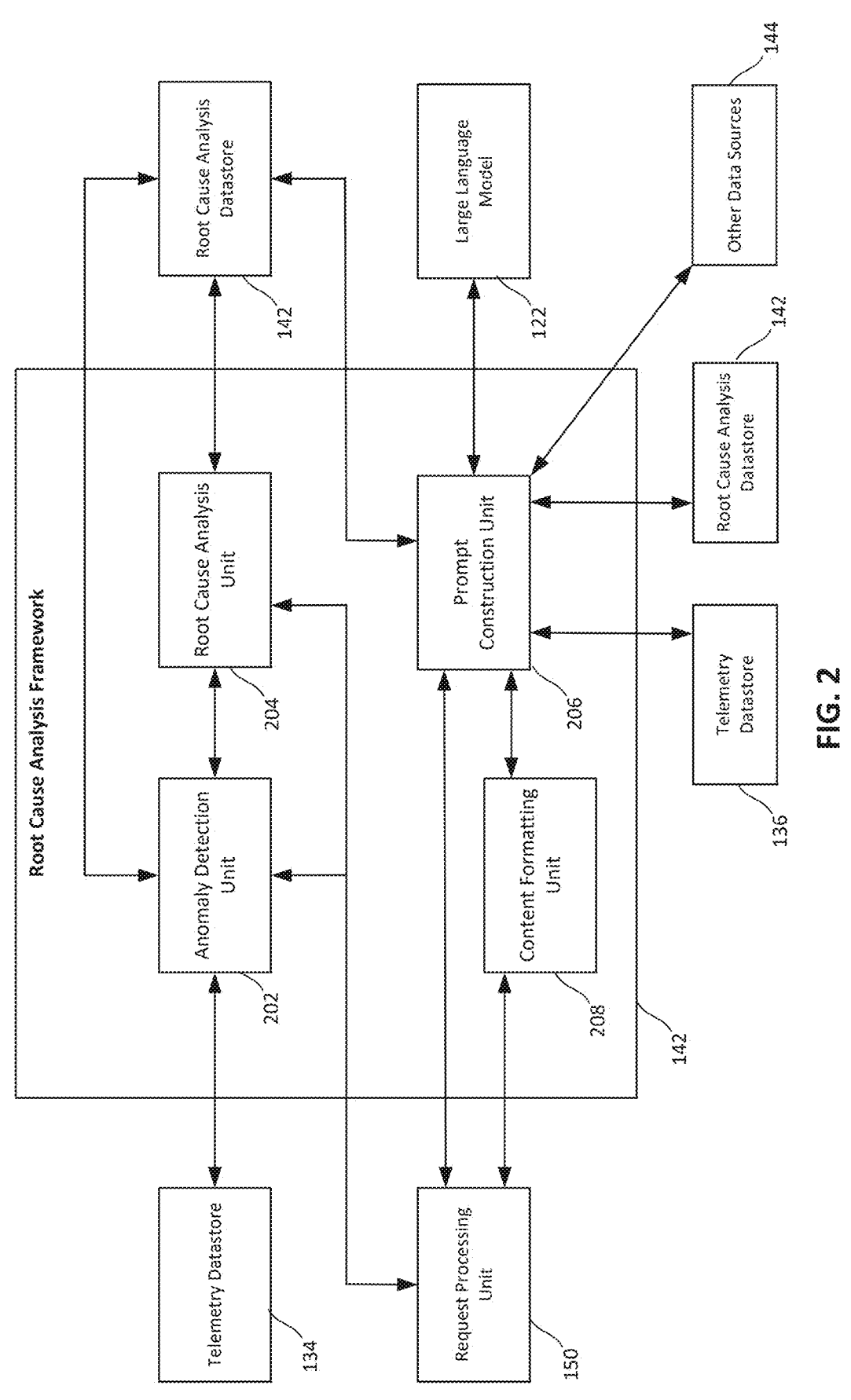
FIG. 2 is a diagram showing an example implementation of the root cause analysis framework shown in FIG. 1.

FIG. 2 is a diagram showing an example implementation of the root cause analysis framework 140 shown in FIG. 1. The root cause analysis framework 140 includes an anomaly detection unit 202 and a root cause analysis unit 204. The root cause analysis framework 140 also includes a content formatting unit 208 and a prompt construction unit 206.

The anomaly detection unit 202 analyzes telemetry data from the telemetry datastore 136 to identify anomalies that are indicative of faults in hardware and/or software components of the local telemetry data sources 132 and/or the remote telemetry data sources 130. In some implementations, the anomaly detection unit 202 implements a modified version of the seasonalAD function implemented by the adtk library, which detects anomalous violations of seasonal patterns. Seasonal patterns, as used herein, refers to characteristics of a timeseries in which the data experiences regular and predictable changes that recur or repeats over a predetermined period of time. The anomaly detection unit 202 detects deviations from these seasonal patterns which may be indicative of a problem associated with a component that has generated the timeseries signal data in which the deviation has been detected. The anomaly detection unit 202 is used by the root cause analysis in three instances. In the first instance, the anomaly detection unit 202 is used to detect anomalies in timeseries signal data. In the second instance, the anomaly detection unit 202 is used to estimate how much each of the sub-signals of anomalous timeseries signal data are contributing towards the overall anomaly. In the third instance, the anomaly detection unit 202 is used to estimate how much newly created sub-signals derived from insights into the root cause of the anomaly. Additional details of how the anomaly detection unit 202 is utilized in each of these instances is discussed in detail in the examples which follow.

The input to the anomaly detection unit 202 includes a data value, a threshold value, and a c-value in some implementations. The data value is a dataframe in which each row is a timeseries signal from the telemetry data, and each row includes one or more columns of data that represent an attribute of a hardware or software component being monitored. The data in each column may be numeric values, rate values, and/or alphanumeric values. The threshold value indicates whether the anomaly detection unit 202 determines lower thresholds, upper thresholds, or both when performing anomaly detection. The default value for the threshold to determine both upper and lower thresholds. The c-value is values that pre-filters results for c-estimate values greater than or equal to the c-value. All results are returned by the anomaly detection unit 202 if the value is null. The default value is 2.0 in some implementations. The output of the anomaly detection unit is a c-estimate. The c-estimate is a series where each value corresponds to a hypothetical c-value for every row in the input dataframe that would have made that row an anomaly for the current time.

The anomaly detection unit 202 performs a classical decomposition on the timeseries data provided as an input in some implementations. The classical decomposition breaks the timeseries data into a seasonality component, a trend component, and a residual component. The seasonality component captures repetitive patterns in the timeseries data that occur within a fixed time period. The fixed time period may include but are not limited to hourly, daily, weekly, monthly, or yearly cycles. The trend component represents a long-term pattern or direction of the timeseries. The residual component represents random fluctuations or noise in the timeseries data that cannot be explained by the trend or seasonality components. The residual can be determined by subtracting the trend and seasonality components from the timeseries data. In other implementations, the anomaly detection unit 202 use a seasonal-trend decomposition using LOESS method on the timeseries data provided as an input. This approach also decomposes the timeseries data into a seasonality component, a trend component, and a residual component. Other decomposition techniques can be utilized in other implementations.

The anomaly detection unit 202 utilizes the residual component to identify anomalies. The anomaly detection unit 202 then determines an absolute value of the residual component values and first quartile (Q1) and/or third quartile (Q3) values. The Q1 value is determined by the anomaly detection unit 202 when determining anomalies in the upper threshold. The Q3 value is determined by the anomaly detection unit 202 when determining anomalies in the lower threshold. The anomaly detection unit 202 determines both the Q1 and Q3 values when determining both the upper and lower thresholds. The anomaly detection unit 202 then determines the c-estimate, which represents a value of c with the signal being right on the anomaly threshold. In contrast, the adtk library outputs a Boolean indicator that indicates where the signal exceeded the threshold. The anomaly detection unit 202 outputs the c-estimate and provides the c-estimate as an input to the root cause analysis unit 204. The anomaly detection unit 202 can also store the c-estimate value in the root cause analysis datastore 142.

The timeseries data may be transformed by a user prior to be analyzed by the anomaly detection unit 202 rather than performing anomaly detection on raw signal data. For instance, the user may wish to perform the anomaly detection against the moving average of the signal data. Other such transformations may be performed on the raw signal data.

The root cause analysis unit 204 separately processes each of the signals identified as having anomalies by the anomaly detection unit 202. The root cause analysis unit 204 creates a labeled dataset from the data received from the anomaly detection unit 202. During the labeling process, the root cause analysis unit 204 determines whether a sub-signal spiked and whether the spike had a significant impact on the overall signal. If both criteria are satisfied, a label value of "1" is associated with the sub-signal. Otherwise, a value of "0" is associated with the sub-signal. Additional details of the data labeling operation are discussed with respect to FIGS. 3A and 3B. The root cause analysis unit 204 then uses labeled data to train an XGBoost model and the model is used to identify insights into the root cause of the anomalies. Additional details of how the model is constructed and the insights into the root cause are determined are discussed with respect to FIG. 3A.

The root cause analysis framework 140 is also configured to provide interactive features in which a user input natural language prompts to interact with the root cause analysis framework 140 to cause the framework to generate specific content. The request processing unit 150 provides the natural language prompt as an input to the prompt construction unit 206 of the root cause analysis framework 140. The prompt construction unit 206 constructs a prompt based on prompt template that has been engineered to cause the LLM 122 to generate specific content. Additional details of such implementations are discussed with respect to FIGS. 4A-4R. The content formatting unit 208 formats the textual output by the LLM 122 in response to the prompt provided to the model by the prompt construction unit 206, and the content formatting unit 208 provides the content to the request processing unit 150 to be provided to the native application 114 or the web application 190 to be presented to the user.

Figure 3A:
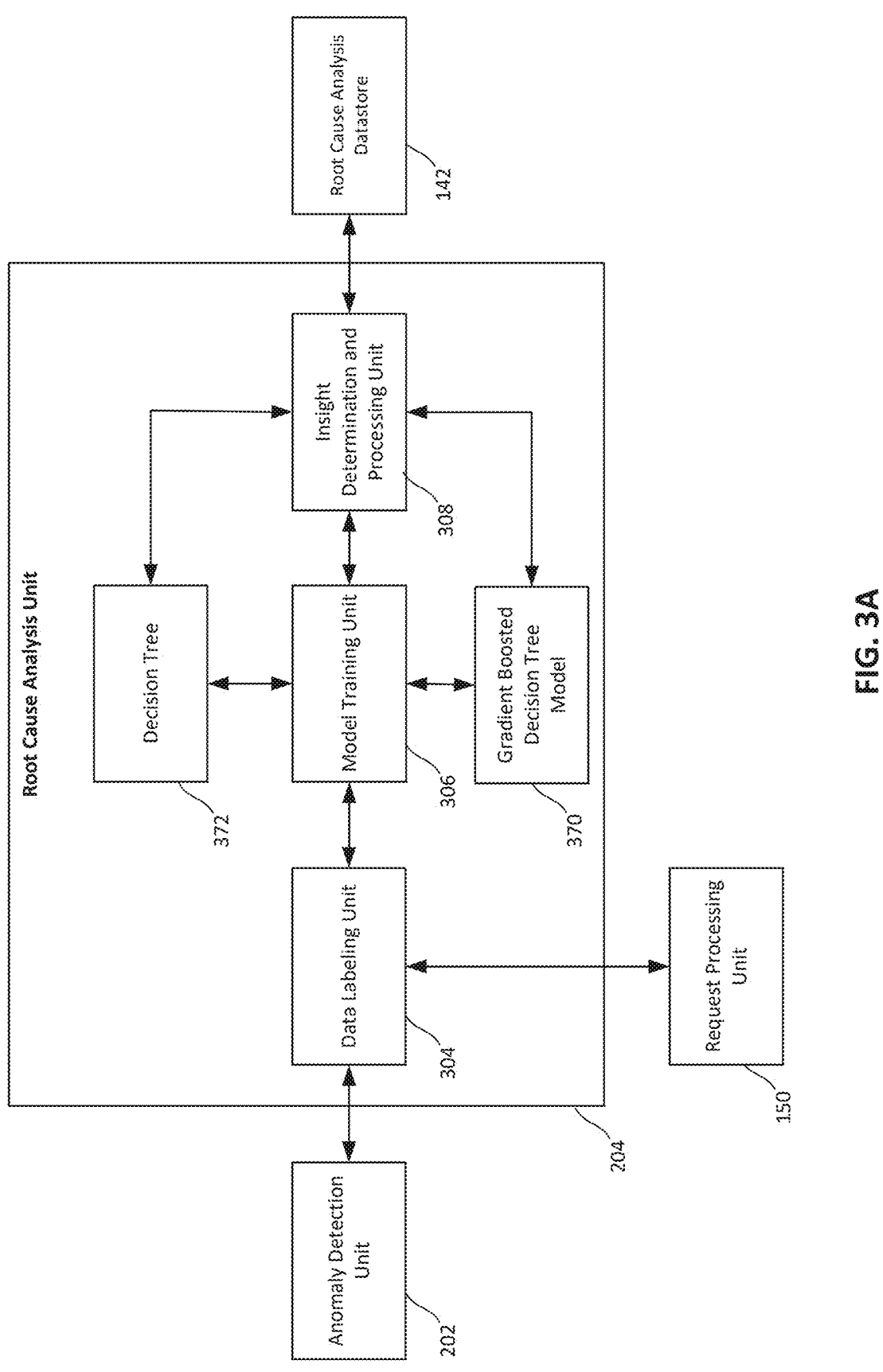
FIG. 3A is a diagram showing an example implementation of the root cause analysis unit 204 shown in FIG. 2.

FIG. 3A is a diagram showing an example implementation of the root cause analysis unit 204 shown in FIG. 2. The root cause analysis unit 204 includes a data labeling unit 304, a model training unit 306, and an insight determination and processing unit 308.

The data labeling unit 304 receives the sub-signals that comprise the anomalous signals identified by the anomaly detection unit 202. The data labeling unit 304 creates a labeled dataset for each of the anomalous signals. The data labeling unit 304 determines whether a sub-signal spiked and whether the spike had a significant impact on the overall signal. If both criteria are satisfied, a label value of "1" is associated with the sub-signal. Otherwise, a value of "0" is associated with the sub-signal. The data labeling unit 304 implements the labeling process 300 shown in FIG. 3B to generate the labeled data.

Once the data labeling unit 304 has generated labeled training data for each of the sub-signals, the model training unit 306 utilizes eXtreme Gradient Boosting (XGBoost) to build a gradient boosted decision tree predictive model 370 using the training dataset generated by the data labeling unit 304 by combining the predictions of multiple individual models. These predictive models can be implemented as one or more decision trees. A technical benefit of this approach is that unlike black box models, the decision tree implementation provides enhanced interpretability of the reasons behind the predictions made by the model. Consequently, the root cause analysis framework 140 can provide additional details explanations regarding the particular root cause of the anomaly. The model training unit 306 also generates a decision tree 372 approximating the predictive model generated by the model training unit 306. The model training unit 306 uses XGBoostTreeApproximator to approximate the trained gradient boosted decision tree predictive model 370 as a decision tree.

The insight determination and processing unit 308 analyzes the XGBoost model to generate single-level insights and multi-level insights. Single-level insights are driven by a single column of the sub-signal data represented in the input dataframe. The single-level insights are based on the columns that are most predictive of the root cause of the anomaly. The insight determination and processing unit 308 performs feature importance analysis on SHAP values to identify the single-level insights. Multi-level insights are derived using values from multiple columns of the sub-signal data. The insight determination and processing unit 308 then examines the decision tree to identify the multi-level insights by parsing decision tree paths for their impact on the overall signal.

SHAP values are model-agnostic metrics that assign an importance value to each feature in a model. Positive SHAP values are assigned to features having a positive impact on a prediction made by the model and negative SHAP values are assigned to features having a negative impact on a prediction made by the model. The magnitude of the SHAP values is proportional to the effect of each of the features on the prediction.

The insight determination and processing unit 308 then aggregates the data associated with the insights into new sub-signals. The insight determination and processing unit 308 collects all of the leaf-level signals that are relevant to an insight and sums these leaf-level signals together into a new signal. For each single-level insight, data containing the identified value in a specific column are selected by the insight determination and processing unit 308. The insight determination and processing unit 308 then gathers this data all other columns to form the new sub-signal. For instance, the new sub-signal for a single-level insight where Ring='2' would encompass a time series comprising all the data associated with Ring 2. In another non-limiting example, suppose that the single-level insight indicates that the "Browser=Chrome" is a root cause. In this instance, the insight determination and processing unit 308 filters all of the leaf-level data on "Browser=Chrome" and adds this data together to form a new signal referred to as "Browser=Chrome". Similarly, for multi-level insights, the process remains consistent, the insight determination and processing unit 308 selects data containing the identified values in the specific columns outlined in the multi-level insights to create the new sub-signal. In another non-limiting example, suppose that the multi-level insight indicate that "Browser=Chrome" and "Language=Japanese" is a root cause. The insight determination and processing unit 308 filters all of the leaf-level data on "Browser=Chrome" and "Language=Japanese" and adds this data together to form a new signal referred to as "Browser=Chrome and Language=Japanese".

The new sub-signals are processed by the anomaly detection unit 202. If the new sub-signals are determined to be anomalous, the insight determination and processing unit 308 determines how much these sub-signals contribute to the overall anomaly margin. The anomaly margin provides a basis for assessing the value of each insight. The insights are sorted, and the results are analyzed as an aggregate before categorizing the results of the analysis into a confidence bucket selected from among a predetermined set of confidence buckets.

Some implementations of the insight determination and processing unit 308 utilize a set of five confidence buckets: (1) definitive cause, (2) probable correlations, (3) possible contributors, (4) inconclusive findings, and (5) technical failure. The definitive cause bucket is selected where the insight determination and processing unit 308 has identified the primary cause of the anomaly. The criterion for selecting this bucket is that normalizing one of the single-level sub-signals would alleviate the overall anomaly. The probable correlations bucket is selected where several features are identified as highly correlated with the potential root cause of the anomaly. The criterion for selecting this bucket is that normalizing the one of the single-level sub-signals or normalizing one to three of the multi-level sub-signals alleviates a majority of the overall anomaly. The possible contributors bucket is selected where their features are likely related to the cause, but do not fully explain the anomaly. The criterion for selecting this bucket is that there is at least one candidate sub-signal contributing to the anomaly in a significant quantity. The inconclusive findings bucket is selected where no definitive cause or contributing features could be isolated. The criterion for selecting this bucket is that none of the candidate sub-signals contribute to the anomaly in a significant quantity. The technical failure bucket is selected where the root cause analysis framework 140 was unable to complete its analysis. The criterion for selecting this bucket is that an error was encountered during the root cause analysis process that prevented the process from being completed. The bucket associated with each of the anomalies can be presented to the user on a user interface of an application that presents the root cause analysis results to a user. Examples of such user interfaces are shown at least in FIGS. 4A-4R.

The output of the insight determination and processing unit 308 is a dataframe in some implementations. The dataframe contains concatenated single-level and multi-level insights as well as column information that related to the significance of the insight as well as level of confidence of the insight. In a non-limiting example, the dataframe for a particular anomaly includes:

SL: Ring="2"

ML: Ring="2" & BrowserName="Chrome"

This provides insight into the root cause of a particular anomaly that occurred in software deployed to Ring 2 of a deployment environment and occurred for users utilizing the Chrome browser. The dataframe may include additional and/or other information for other type of anomalies. The dataframe may be stored in the root cause analysis datastore 142 and/or provided to the request processing unit 150 to provide information related to an anomaly to be presented on a user interface of the native application 114 and/or the web application 190.

Figure 3B:
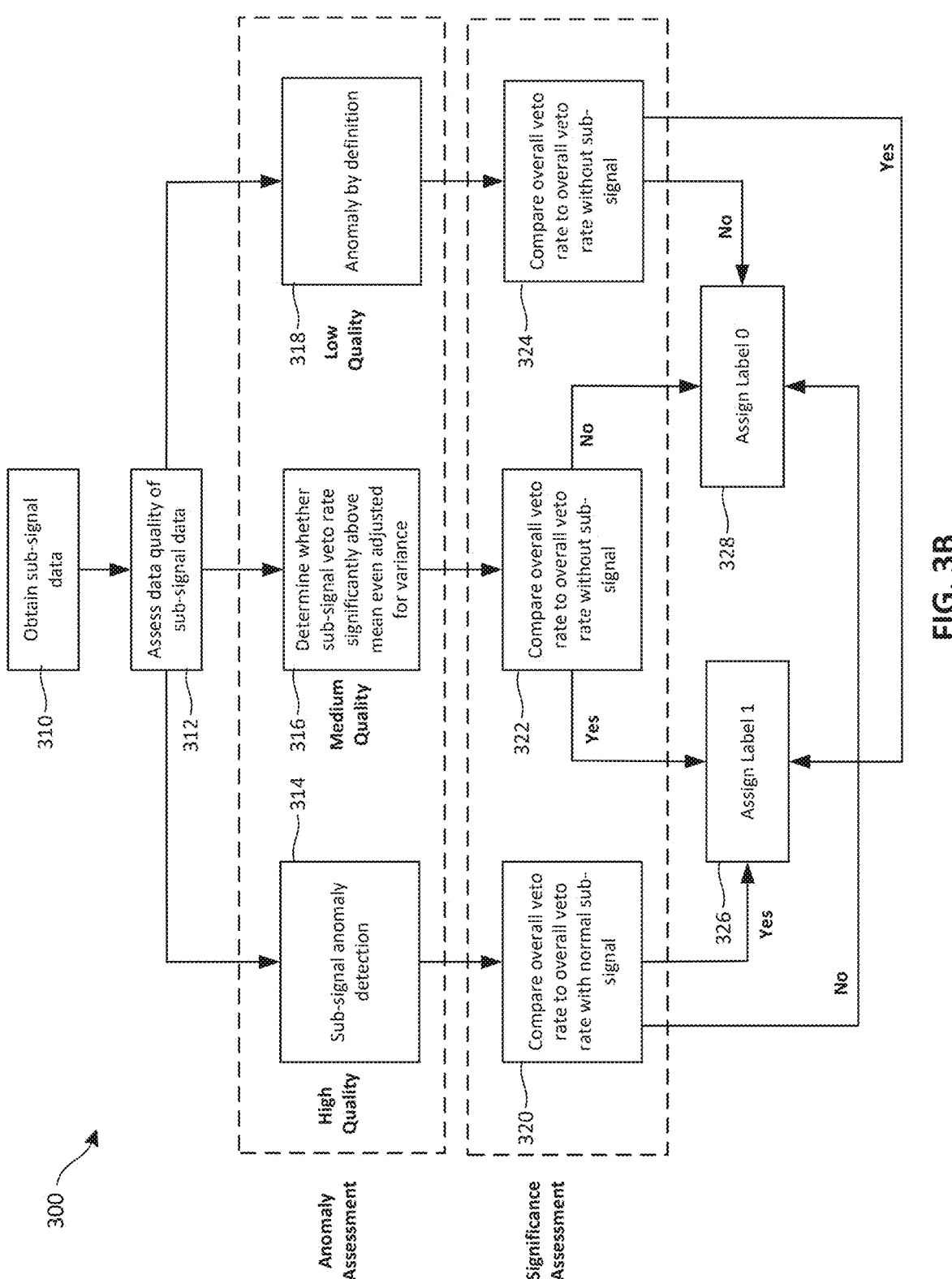
FIG. 3B is a flow diagram of an example data labeling process that can be implemented by the data labeling unit shown in FIG. 3A.

FIG. 3B is a flow diagram of an example data labeling process 300 that can be implemented by the data labeling unit shown in FIG. 3A. The labeling process 300 can be implemented by the data labeling unit 304 of the root cause analysis unit 204. The labeling process 300 includes a first phase in which an assessment is made of the quality level of the anomaly detection in the sub-signal data and a second phase in which an assessment of the significance of the significant of the detected anomaly based on quality-level specific thresholds. In the second phase, the high-quality signal data is assessed to determine if the current data point for the sub-signal was not anomalous (c-estimate=0), would the overall anomaly be either non-anomalous or reduced by a threshold amount after accounting for historical variance? For instance, was there a c-estimate reduction of at least 2? The low and medium quality sub-signal data is assessed to determine if the current data point for the sub-signal is removed, would the overall anomaly be either non-anomalous or reduced by a threshold amount after accounting for historical variance? For instance, was there a c-estimate reduction of at least 2? The first phase includes operations 314, 316, and 318, and the second phase includes operations 320, 322, and 324.

The labeling process 300 includes an operation 310 of obtaining the sub-signal data to be labeled. As discussed above, the data comprises timeseries signal data in which the anomaly detection unit 202 has determined includes an anomaly. The signal data may include a plurality of sub-signals, and each of these sub-signals is analyzed individually in the labeling process 300. The labeling process 300 also includes an operation 312 in which the data labeling unit 304 assesses the data quality of the sub-signal data. The data labeling unit 304 categorizes the signal data as being high-quality data, medium-quality data, or low-quality data.

In operation 314, the data labeling unit 304 categories the sub-signal data as high-quality data if the sub-signal triggers anomaly detection. The data labeling unit 304 submits the sub-signal to the anomaly detection unit 202 to obtain a determination whether the sub-signal data triggers the anomaly detection. If the sub-signal triggers the anomaly detection, then the sub-signal data is determined to be high quality and the labeling process 300 proceeds to operation 320.

In operation 316, the data labeling unit 304 determines whether the current value of the sub-signal data exceeds a mean value for the sub-signal by a threshold amount after normalizing the sub-signal data values against historical variance. The historical variance data can be determined based on data stored in the telemetry datastore 136 and/or the root cause datastore 142. If the data labeling unit 304 determines that the sub-signal data exceeds the mean value, then the sub-signal data is determined to be medium quality and the process proceeds to operation 322.

In operation 318, the data labeling unit 304 determines whether the sub-signal is highly sparse and/or comprises a single datapoint. A highly sparse sub-signal includes less than a threshold number of datapoints. Such sub-signals are considered to be anomalous and of low quality. If the operation is determined to be highly sparse and/or comprises a single datapoint, the operation continues with operation 324.

In operation 320, the data labeling unit 304 compares the overall veto rate associated with the sub-signal with the overall veto rate with a normal sub-signal. If this condition is satisfied, the labeling process 300 continues with operation 326 in which the label 1 is assigned to the sub-signal data. Otherwise, the labeling process 300 continues with operation 328 in which the label 0 is assigned to the sub-signal data.

In operation 322, the data labeling unit 304 compares the overall veto rate of the sub-signal with the overall veto rate of the signal without the anomalous sub-signal. If this condition is satisfied, the labeling process 300 continues with operation 326 in which the label 1 is assigned to the sub-signal data. Otherwise, the labeling process 300 continues with operation 328 in which the label 0 is assigned to the sub-signal data.

In operation 324, the data labeling unit 304 compares the overall veto rate of the sub-signal with the overall veto rate of the signal without the anomalous sub-signal. If this condition is satisfied, the labeling process 300 continues with operation 326 in which the label 1 is assigned to the sub-signal data. Otherwise, the labeling process 300 continues with operation 328 in which the label 0 is assigned to the sub-signal data.

Figure 4A:
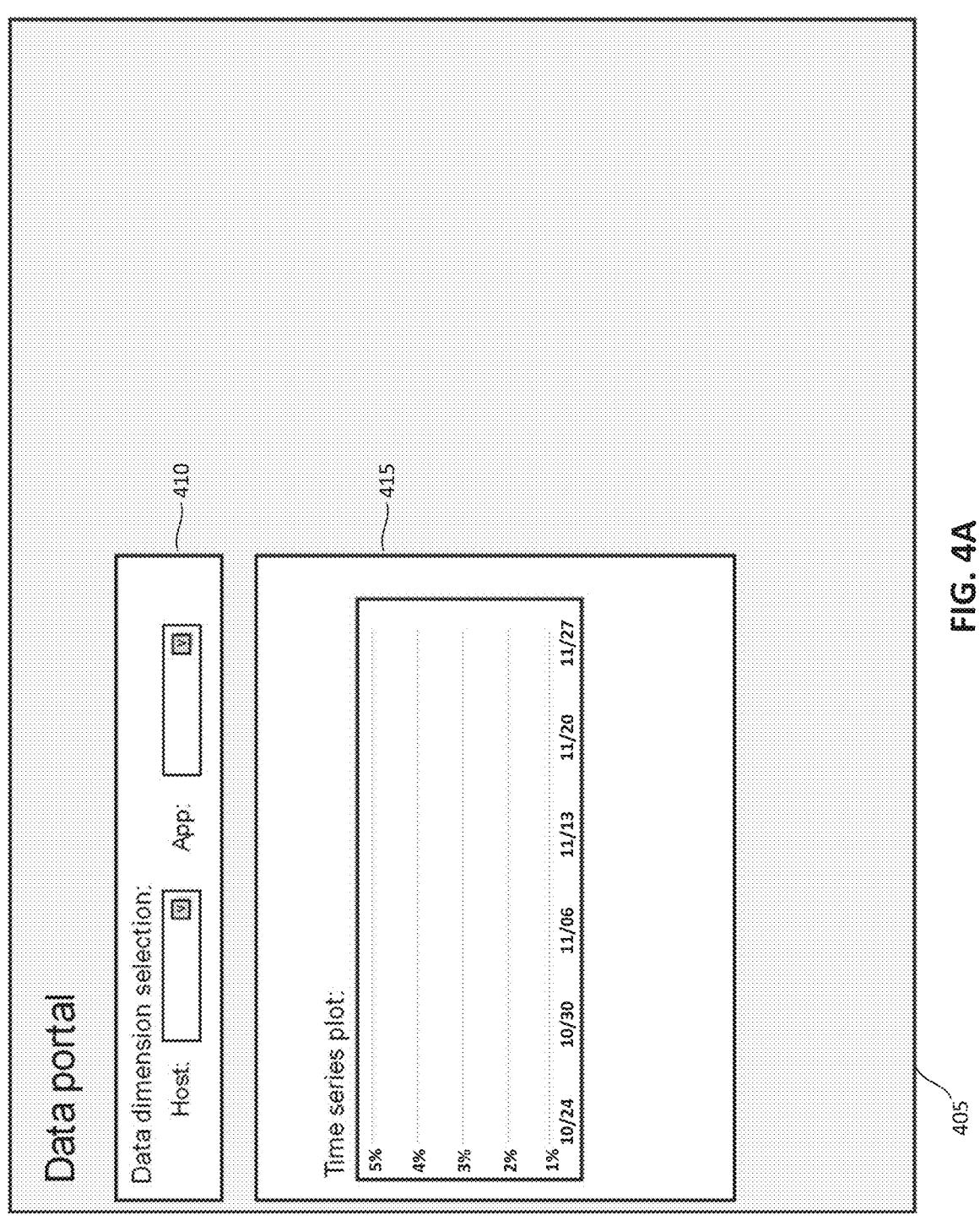
FIGS. 4A-4R are diagrams showing an example user interface of an application that implements root cause analysis according to the techniques disclosed herein.

FIGS. 4A-4R are diagrams showing an example user interface 405 of a data portal application that implements root cause analysis according to the techniques disclosed herein. As discussed in the preceding examples, the data portal application may be a native application on the client device 105, such as the native application 114 or implemented as a web application 190 accessed via the browser application 112 of the client device.

FIG. 4A shows an initial state of the data portal application. The user interface 405 includes a user control pane 410 and a data pane 415. The user control pane 410 includes controls that enable the user to input parameters for selecting which timeseries signals are to be displayed in the data pane 415. The example shown in FIG. 4A includes two controls for entering a host and application. However, other implementations can include controls for selecting different data dimensions and/or a different number of data dimensions.

Figure 4B:
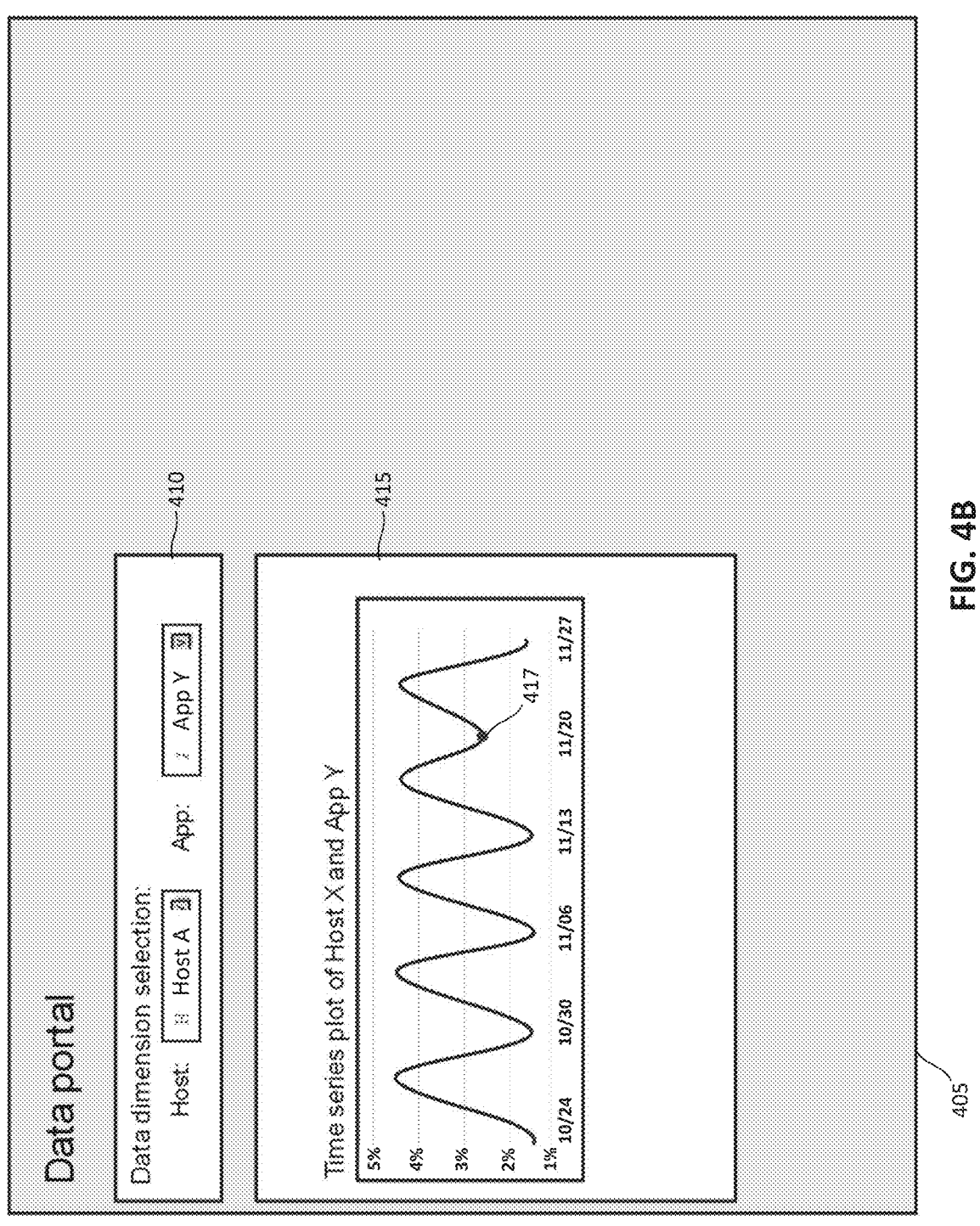

FIG. 4B shows an example of the user interface 405 in which the user has selected a specific host and application. The timeseries signal data is populated in the data pane 415. In some implementations, the native application 114 and/or the web application 190 generates a plot of the timeseries data signal. In other implementations, the anomaly detection unit 202 generates the plot or other visualization of the timeseries data signal and provides the plot or other visualization to the native application 114 or the web application 190. The indicator 417 on the plot of the timeseries data represents an anomaly detected by the root cause analysis framework 140. The user interface 405 causes the native application 114 or the web application 190 to provide the parameters selected by the user using the controls of the user control pane 410 to the request processing unit 150 of the application services platform 110. The request processing unit 150 provides the user-selected parameters to the anomaly detection unit 202 to generate the timeseries plot of the signal data and to identify anomalies in the signal data. In the example shown in FIG. 4B, there is a single anomaly shown. However, the anomaly detection unit 202 may identify more than one anomaly which may be shown on the plot of the signal data.

Figure 4C:
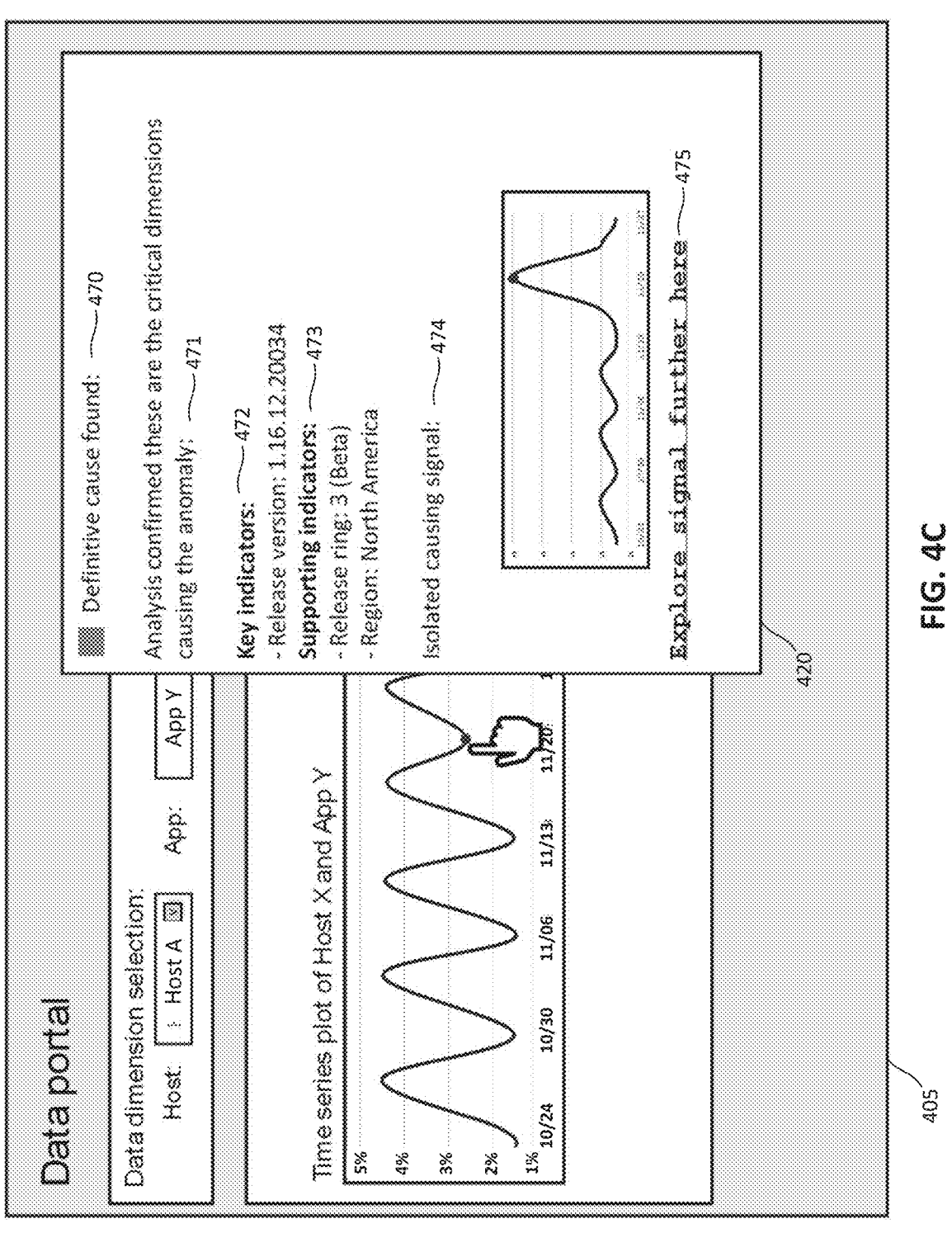

FIG. 4C shows an example of the user interface 405 in which the user has selected the indicator 417 by clicking on, touching, or otherwise activating the indicator 417. The user interface 405 presents the anomaly detail pane 420. The anomaly detail pane 420 provides details regarding the anomaly represented by the indicator 417. The anomaly detail pane 420 presents a visualization of information related to the anomaly. The visualization can include textual and/or graphical content. The textual content includes a description of the anomaly, the predicted root cause of the anomaly, and/or other information that can help the user understand the why the anomaly has occurred and how to correct the anomaly. The textual content can include content generated by the LLM 122 based on one or more prompts constructed by the prompt construction unit 206 and/or information selected from the root cause analysis datastore 142 and/or from the decision tree 372 derived from the gradient boosted decision tree model 370 developed by the model training unit 306. The graphical content may include one or more graphs or diagrams that show additional details about the anomaly. The prompt construction unit 206 constructs a prompt to the one or more other generative models 124 to obtain the graphs or other diagrams included in the visualization content presented in the anomaly detail pane 420.

In the example shown in FIG. 4C, the anomaly detail pane 420 shows an example in which a definitive cause for the anomaly has predicted by the root cause analysis framework 140. As discussed in the preceding examples, the root cause analysis unit 204 determines a level of confidence on the output. In the example implementation shown here, the root cause analysis unit 204 selects a level of confidence from among a set of five levels. Other implementations can support a different set of levels of confidence. The anomaly detail pane 420 includes a title 470 that indicates the level of confidence. The anomaly detail pane 420 includes text 471 describing how to interpret the results shown in the detail pane 420. The anomaly detail pane 420 also includes a primary feature (dimension) 472 related to the anomaly in the signal. The details can include the value of the feature. In the example shown in FIG. 4C, a specific software release version is the primary feature determined to have caused the anomaly. The anomaly detail pane 420 also includes related causes 473 in some instances. The related causes 473 are features and values that the root cause analysis unit 204 found to be highly related to the primary cause. In the example shown in FIG. 4C, the release version found a primary cause is highly correlated to ring 3 and the North America region. The related features can help a user identify that the release is a beta release and the region impacted by the release. The anomaly detail pane 420 can include a visualization 474 targeting the primary cause. The anomaly detail pane 420 can also include a link 475, which when activated, causes the root cause analysis framework 140 to generate additional information that enables the user to further investigate and troubleshoot the root cause of the anomaly.

Figure 4D:
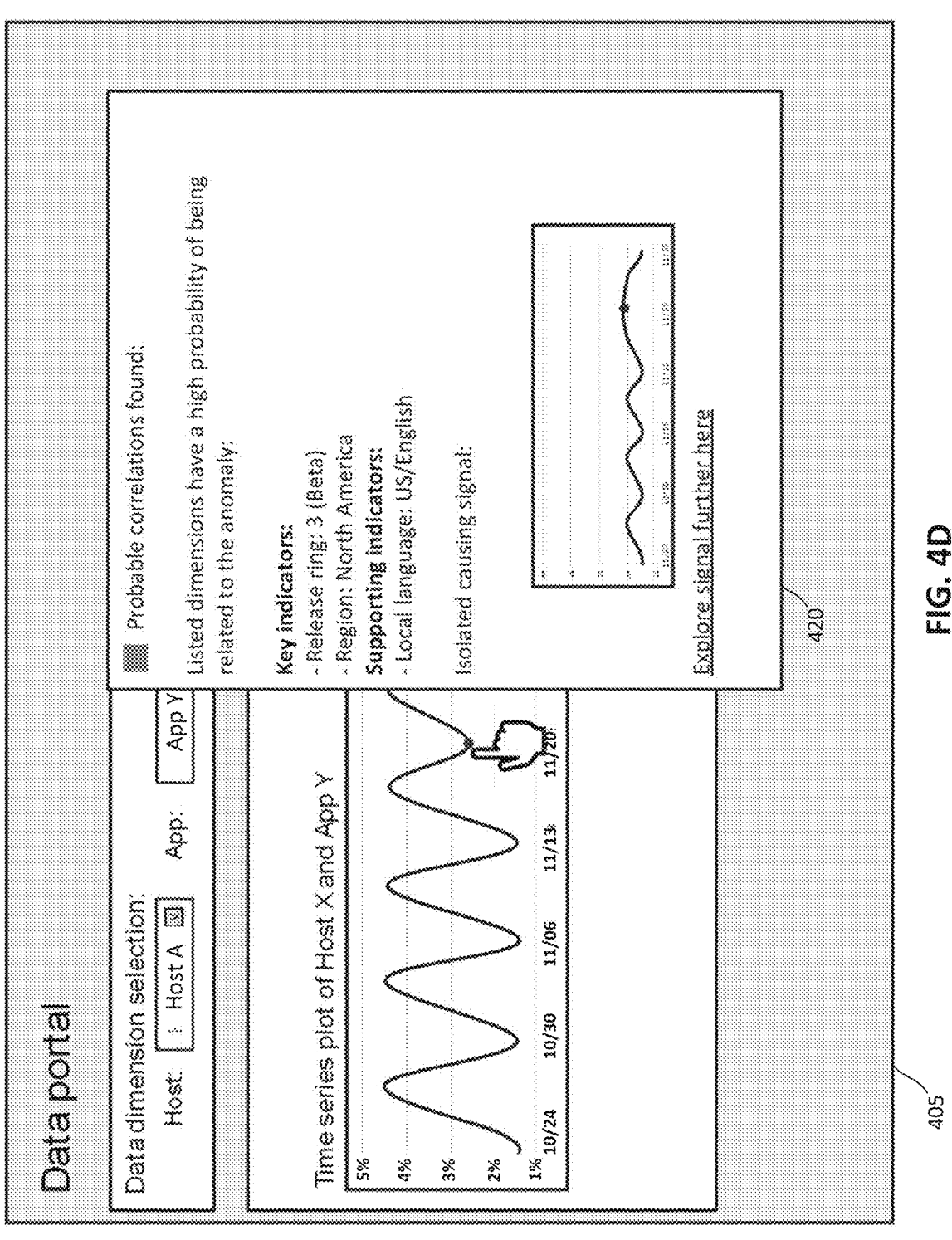
Figure 4E:
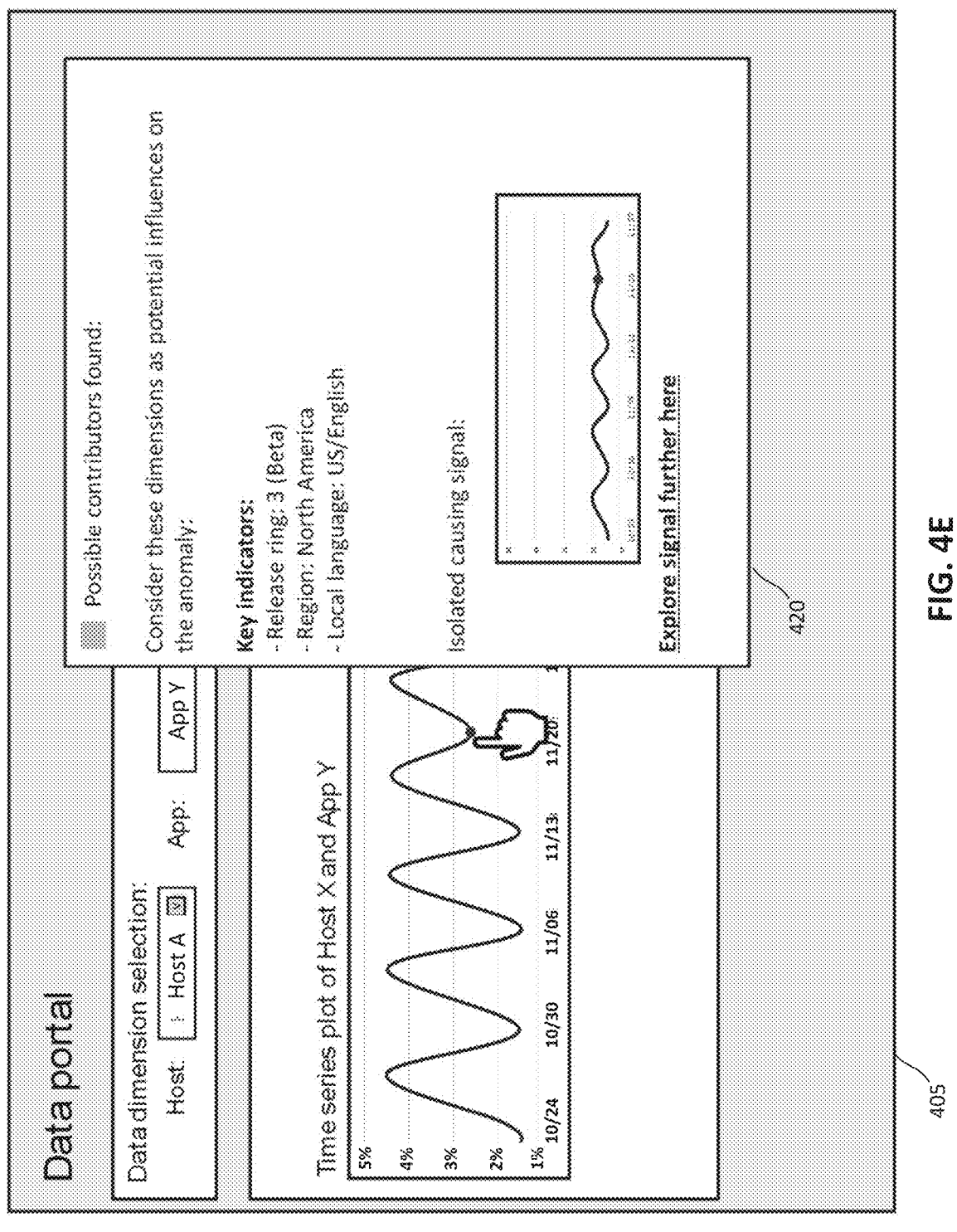
Figure 4F:
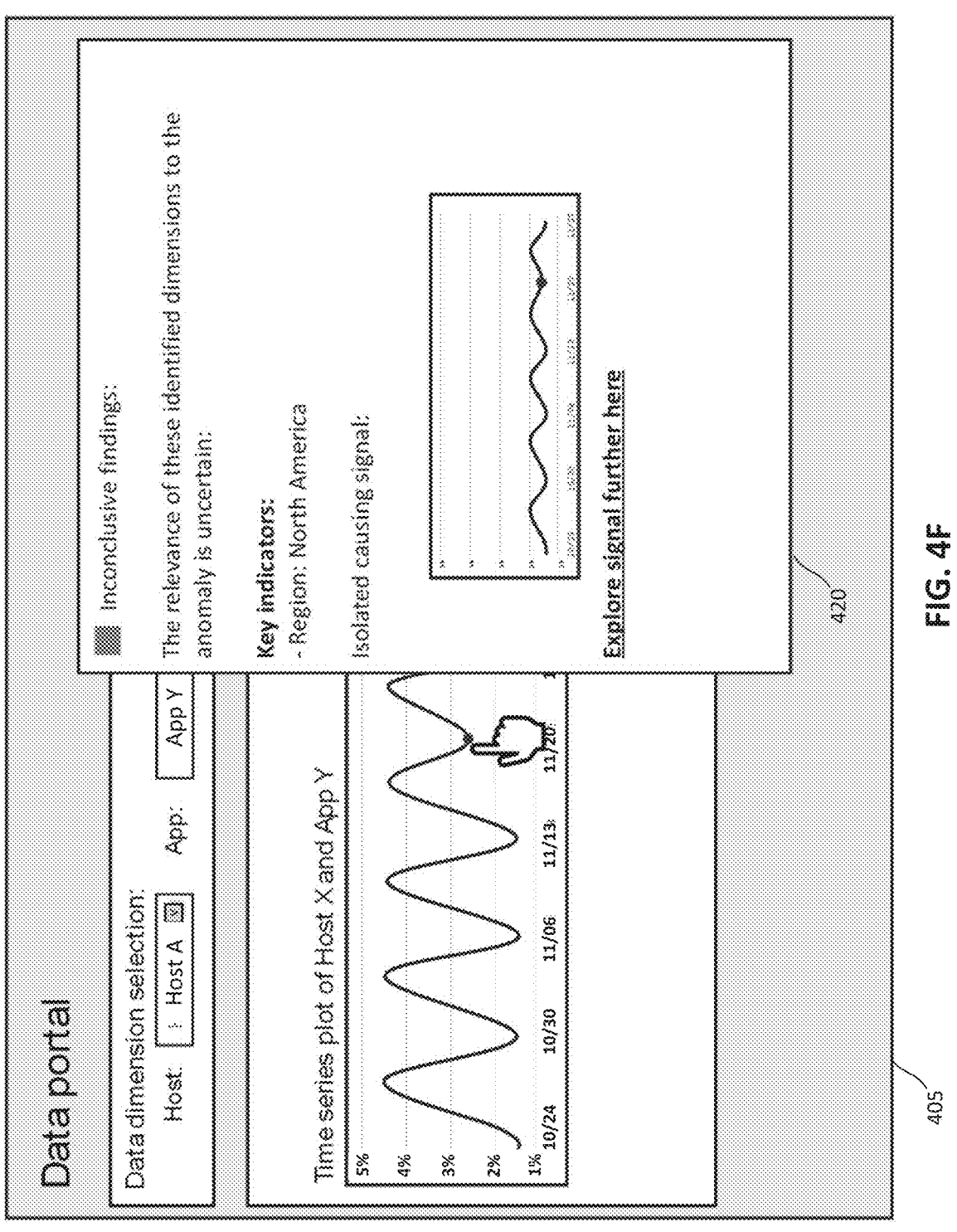
Figure 4G:
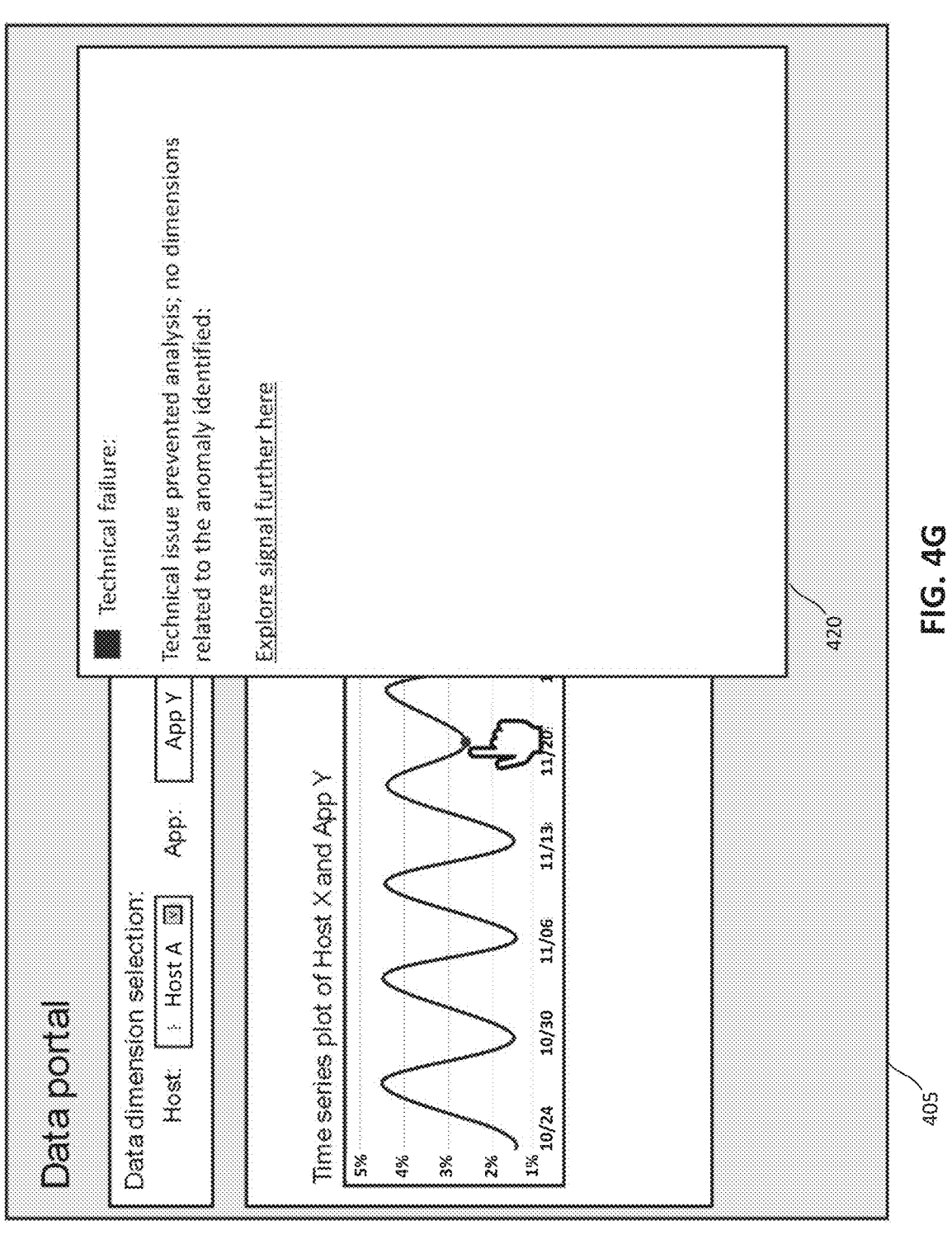

FIGS. 4D-4G provide examples of the user interface 405 in which the root cause analysis unit 204 has determined the root cause of the anomaly with a different level of confidence as that shown in FIG. 4C. The examples shown in FIGS. 4C-4G are examples in decreasing levels of confidence. FIG. 4D is an example in which "probable correlations" have been found for the cause of the anomaly. FIG. 4E is an example in which "possible correlations" have been found. FIG. 4F is an example in which "inconclusive findings" have been found. FIG. 4G is an example in which "technical failure" has occurred and the root cause analysis unit 204 could not determine a root cause for the anomaly.

Figure 4H:
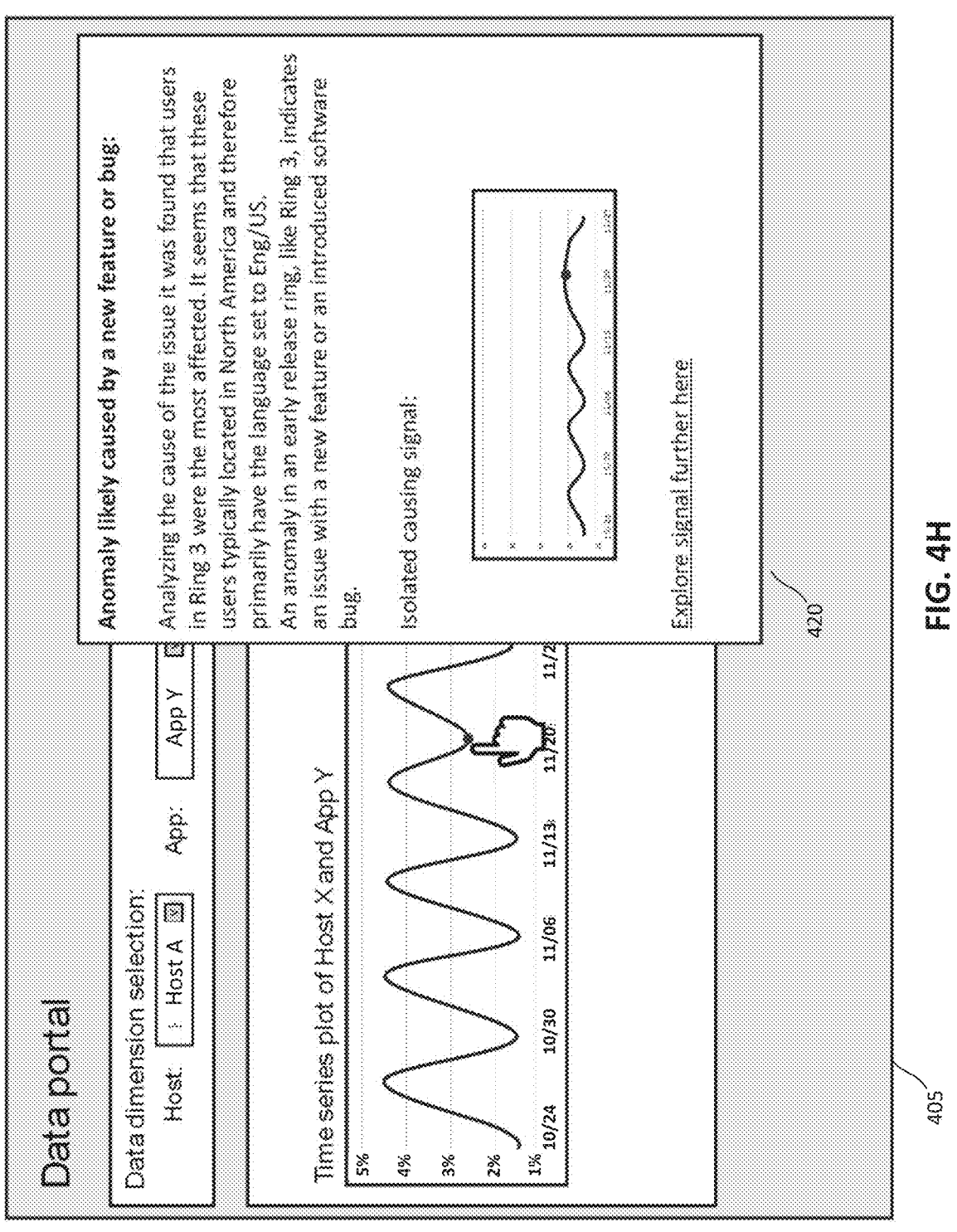

FIG. 4H shows another implementation of the user interface 405 in which the anomaly detail pane 420 includes content generated by the LLM 122. In the example shown in FIG. 4H, the LLM 122 is used to interpret output data from the root cause analysis framework 140, understanding the severity and scope of the issue, the potential correlation between the identified indicators and even the number of presented indicators and outputting a concise, human-readable interpretation of the particular detected anomaly and the root cause of the anomaly. A technical benefit of this approach is that the LLM 122 utilizes the categories shown in the preceding examples and generates additional content discussing the anomaly and the root cause of the anomaly that can be used to help a user better understand how to remedy the root cause of the anomaly. In other implementations, the LLM 122 does not utilize a predefined set of categories as discussed in the preceding examples. Instead, the LLM generates a customized response based on the analysis of the various factors described above. A technical benefit of this latter approach is that the LLM 122 is not constrained to provide results that fall into one of the predetermined categories and can instead provide a more fine-grained and customized result to the user for addressing the root cause of an anomaly.

Figure 4I:
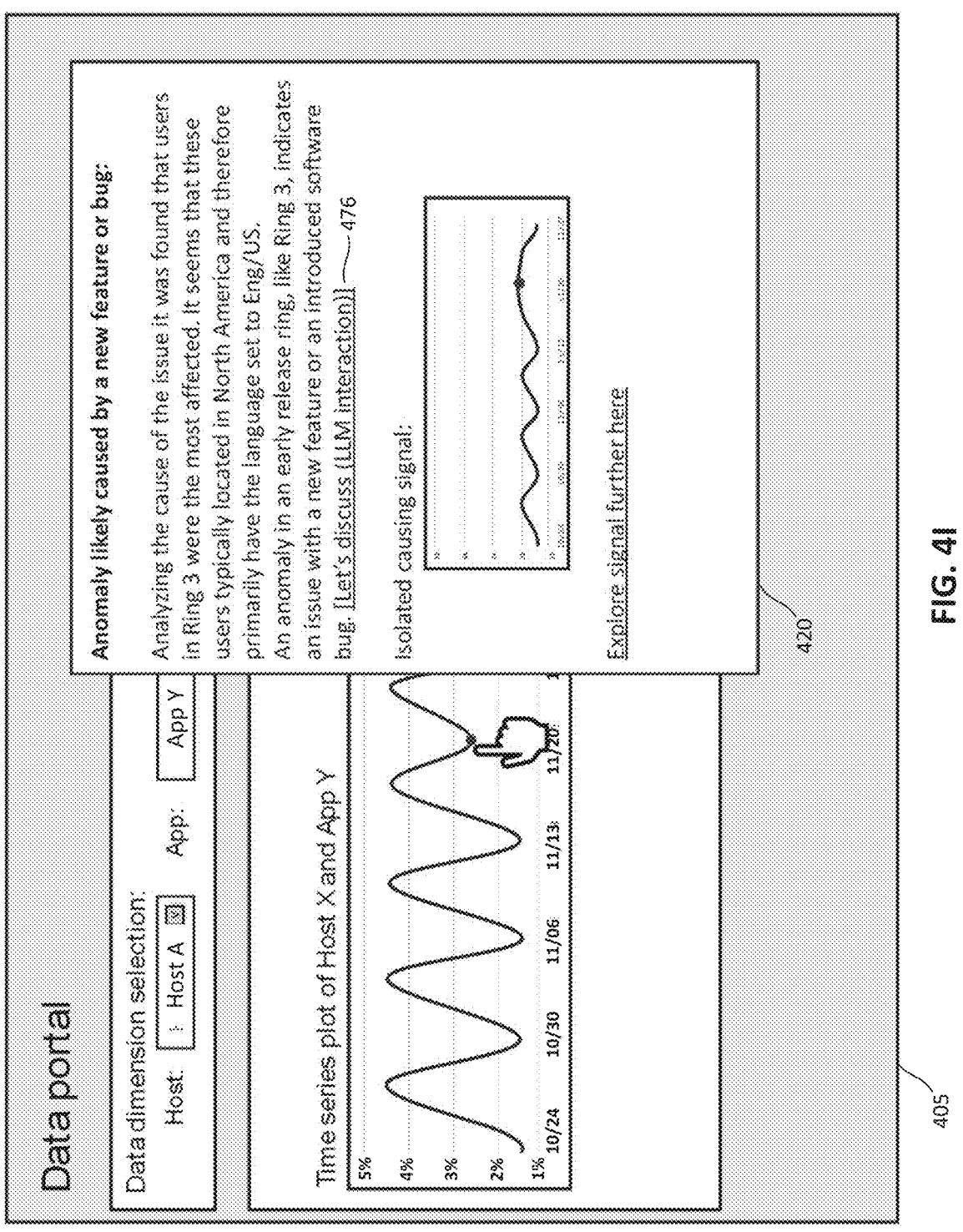

FIG. 4I shows another implementation of the user interface 405 in which the anomaly detail pane 420 includes content generated by the LLM 122. In the example shown in FIG. 4I, the LLM-generated content includes a link 476, which when clicked on or otherwise activated, causes the user interface 405 to present an interface that enables the user to participate in an interactive conversation with the LLM 122 with the complete context of the root cause analysis issue. When the link is clicked, the native application 114 or the web application 190 provides an indication that the user has requested an interactive conversation to the prompt construction unit 206, and the prompt construction unit 206 accesses the technical content information that has already been determined by the root cause analysis unit 204 for the anomaly from the root cause analysis datastore 142. Additional details of the prompt construction performed by the prompt construction unit 206 are discussed in detail in the examples which follow. The interactive conversation enables the user to input natural language prompts asking questions about the anomaly and the root cause thereof and the LLM 122 uses the technical content information to generate a response to these queries.

Figure 4J:
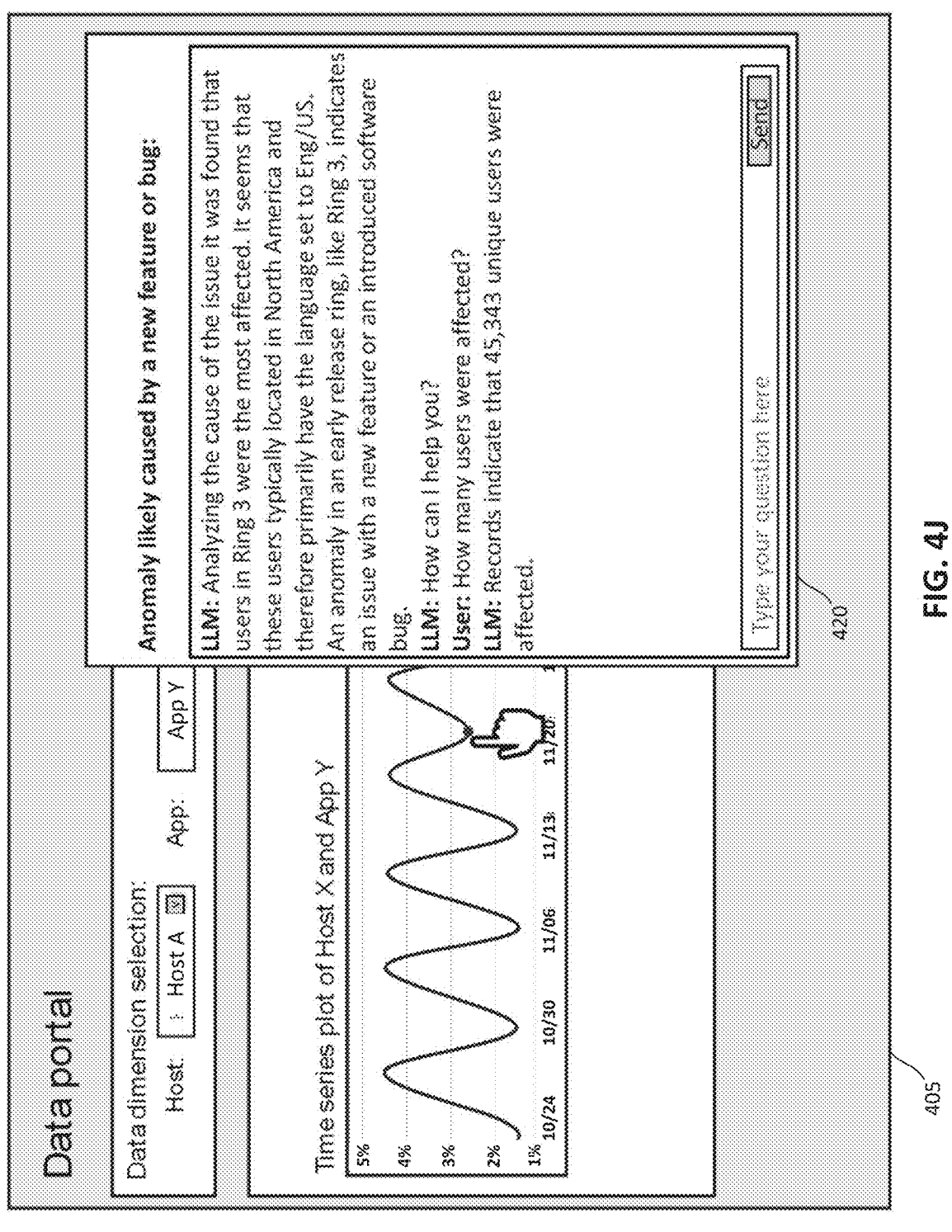

FIG. 4J shows as example of the conversation interface being presented in the anomaly detail pane 420. The user can directly query the root cause analysis framework 140 for additional information. The prompt construction unit 206 receives the natural language prompt input by the user via the request processing unit 150. The prompt construction unit 206 constructs a prompt based on the natural language prompt input by the user and provide the prompt as an input to the LLM 122. The LLM 122 generates a response to the query, and the prompt construction unit 206 provides the response to the content formatting unit 208 to format the response to be presented to the user. The content formatting unit 208 then provides the formatted response to the request processing unit 150 to be forwarded to the native application 114 or the web application 190 to present to the user. In some instances, the LLM 122 determines that additional information not included in the technical content information is required to generate the response to the natural language prompt input by the user. In such instances, the LLM 122 outputs an indication that additional information is required to the prompt construction unit 206. The prompt construction unit 206 formulates a data query to one or more data sources, such as but not limited to the telemetry datastore 136, the root cause analysis datastore 142, and/or the other data sources 144. In some instances, the other data sources 144 includes code associated with the software components associated with the anomaly, and the LLM 122 can generate a proposed bug fix for correcting an error in the program code in response to determining that the anomaly is caused by a potential software coding issue. The LLM 122 can also suggest adjusting configuration parameters associated with hardware and/or software components of the computing system. In addition to these actions, the LLM 122 can also suggest other types of mitigating actions that can be taken to resolve a problem that caused the anomaly. The prompt construction unit 206 provides the data obtained from the data sources to the LLM 122 for analysis, and the LLM 122 generates a response to the natural language prompt input by the user. The prompt construction unit 206 then provides the response to the content formatting unit 208 for processing. The LLM 122 can also evaluate the additional information obtained from the data sources by the prompt construction unit 206 and make a determination that the additional information is insufficient to answer the natural language query input by the user. The LLM 122 can request that the prompt construction unit 206 attempt to obtain additional information that satisfies the query. The LLM 122 can iteratively request additional information and analyze the additional information obtained until a determination is made that the information needed to answer the natural language prompt input by the user has been obtained or that such information is likely unavailable. When the LLM 122 determines that the required information is unavailable, the LLM 122 generates a response that indicates that information needed to complete the user query could not be obtained.

Figure 4K:
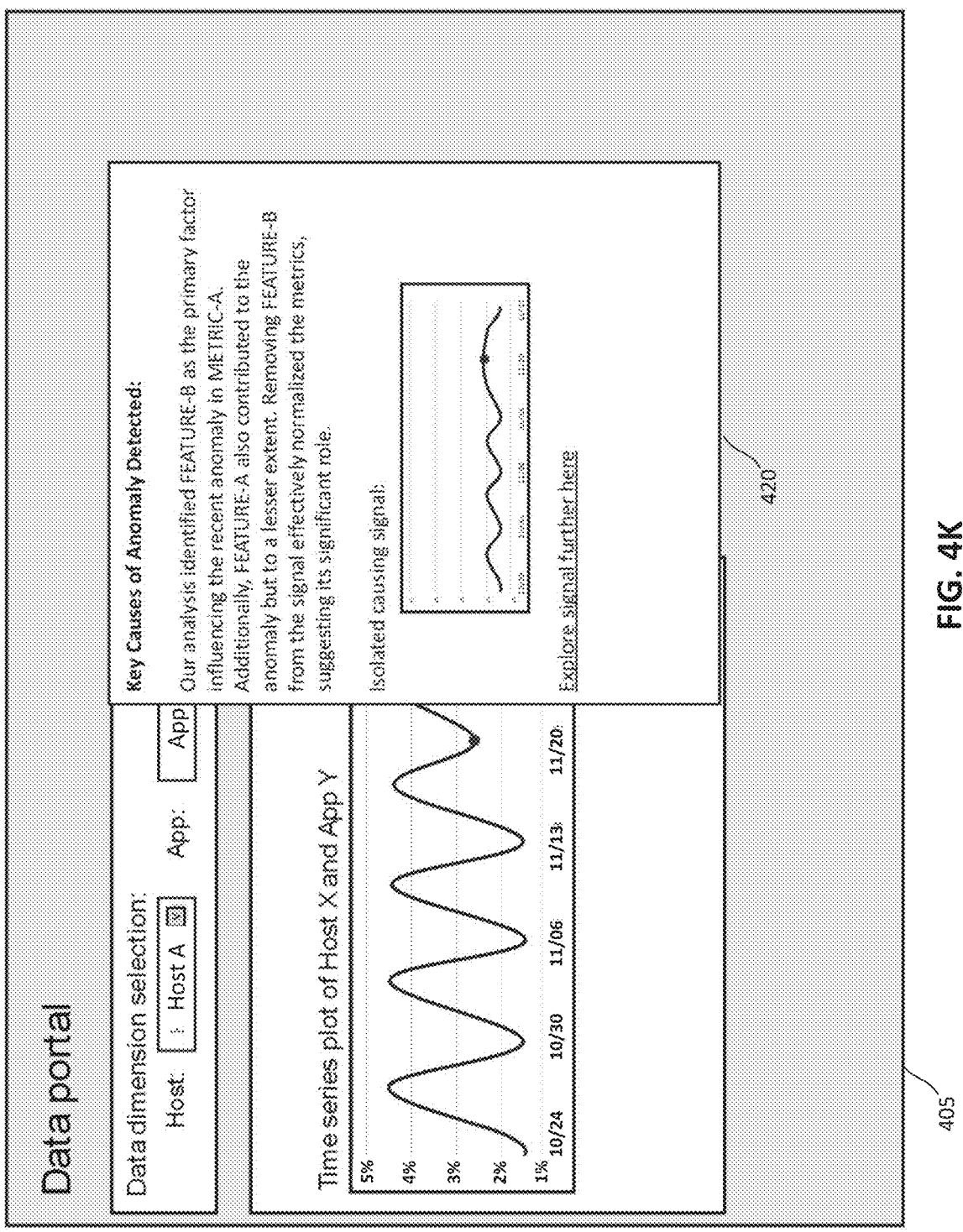

FIG. 4K shows another implementation of the user interface 405 in which the anomaly detail pane 420 includes content generated by the LLM 122. FIG. 4L shows an example prompt template 432 that can be utilized by the prompt construction unit 206 to construct the prompt to the LLM 122 to cause the LLM 122 to generate the content related to the anomaly and the root cause of the anomaly presented in the anomaly detail pane 420. The bold text in the prompt template 432 are values that the prompt construction unit 206 has filled into the template based on the technical content information associated with the anomaly. The output 434 is an example of the output generated by the LLM 122 in response to the prompt generated based on the prompt template 432.

Figure 4M:
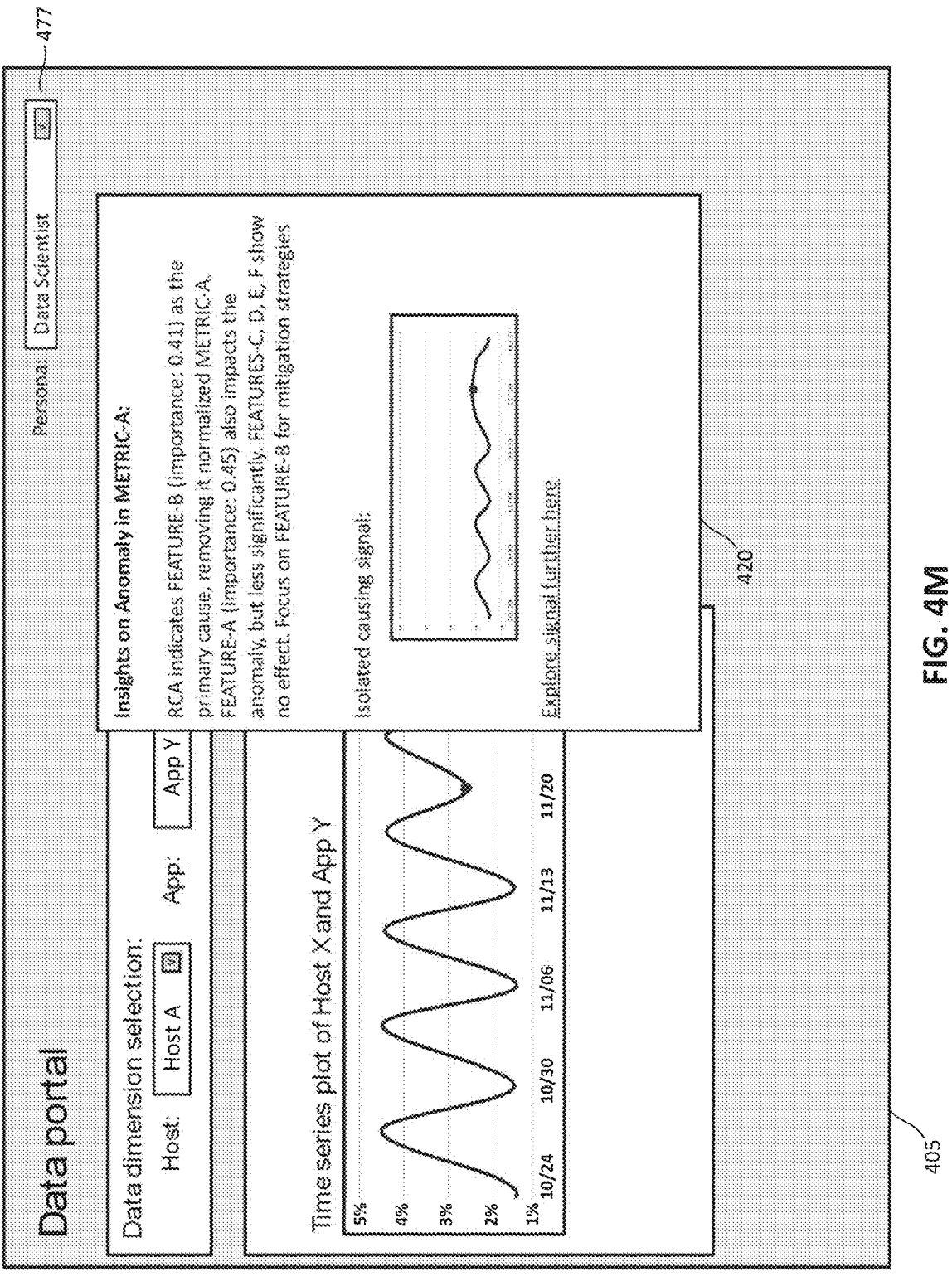

FIG. 4M shows another implementation of the user interface 405 in which the anomaly detail pane 420 includes content generated by the LLM 122. However, the content generated in the example shown in FIG. 4M is customized according to a selected "persona" that suites the particular technical expertise level of the user. For example, a statistician might want a much more concise and technical summary of the anomaly while a project manager might prefer an output with fewer technical details a more of a focus on impact and severity. The user interface 405 includes a dropdown 477 that enables the user to select a particular persona to be used in generating the content. The user interface 405 provides a persona indicator to the prompt construction unit 206 that the prompt construction unit 206 uses to access persona information from the root cause analysis datastore 142 providing contextual information to the first prompt to customize the description for the user. The prompt construction unit 206 includes the persona information in the prompt provided to the LLM 122 based on the indication of the persona selected on the user interface 405. The description of the persona provides the LLM 122 with context regarding the intended audience of the content to be generated, the types of information to include in the content to be generated, a level of detail of the content to be generated, and/or how technical to make the content to be generated based on an expected technical understanding of the user and/or technical requirements of the user based on their persona.

FIG. 4N shows an example prompt template 436 that can be utilized by the prompt construction unit 206 to construct the prompt to the LLM 122 to cause the LLM 122 to generate the content related to the anomaly and the root cause of the anomaly presented in the anomaly detail pane 420. The prompt includes an indication of the persona selected by the user and requests that the LLM 122 tailor the output to the selected persona. The example output 438 shows the output of the LLM 122 in response to the prompt based on the prompt template 436. The anomaly detail pane 420 includes a link 499, which when clicked on or otherwise activated, causes the user interface 405 to present an interface (shown in FIG. 4Q) that enables the user to participate in an interactive conversation with the LLM 122 with the complete context of the root cause analysis issue.

Figure 4O:
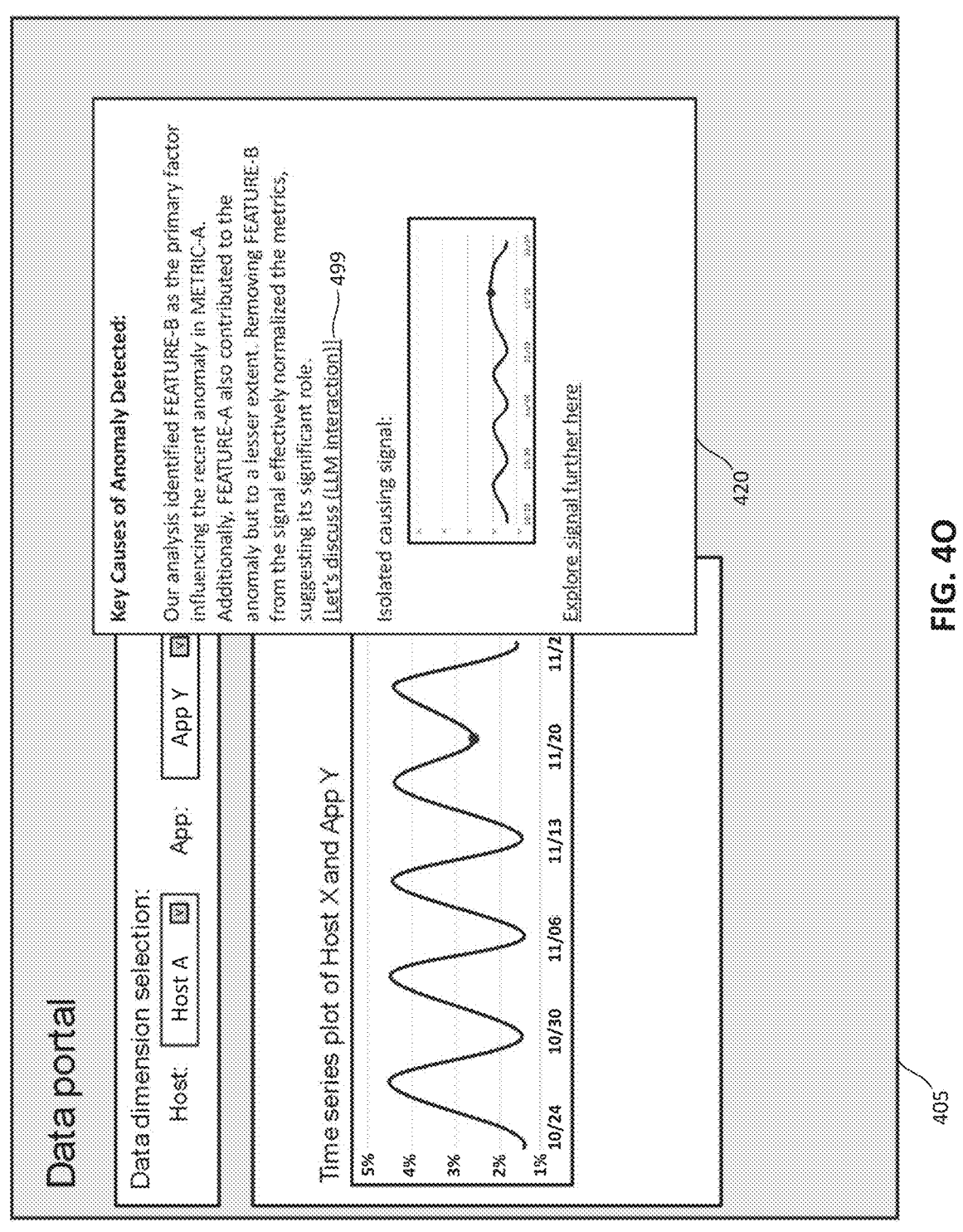

FIG. 4O shows another implementation of the user interface 405 in which the anomaly detail pane 420 includes content generated by the LLM 122. FIG. 4P shows an example prompt 442 for generating the content shown in the anomaly detail pane 420. The prompt 442 includes generate guidance of the output to be generated by the LLM 122 and detailed data from the root cause analysis framework 140. The output 444 of the LLM 122 is generated by the LLM 122 in response to the prompt 442.

Figure 4Q:
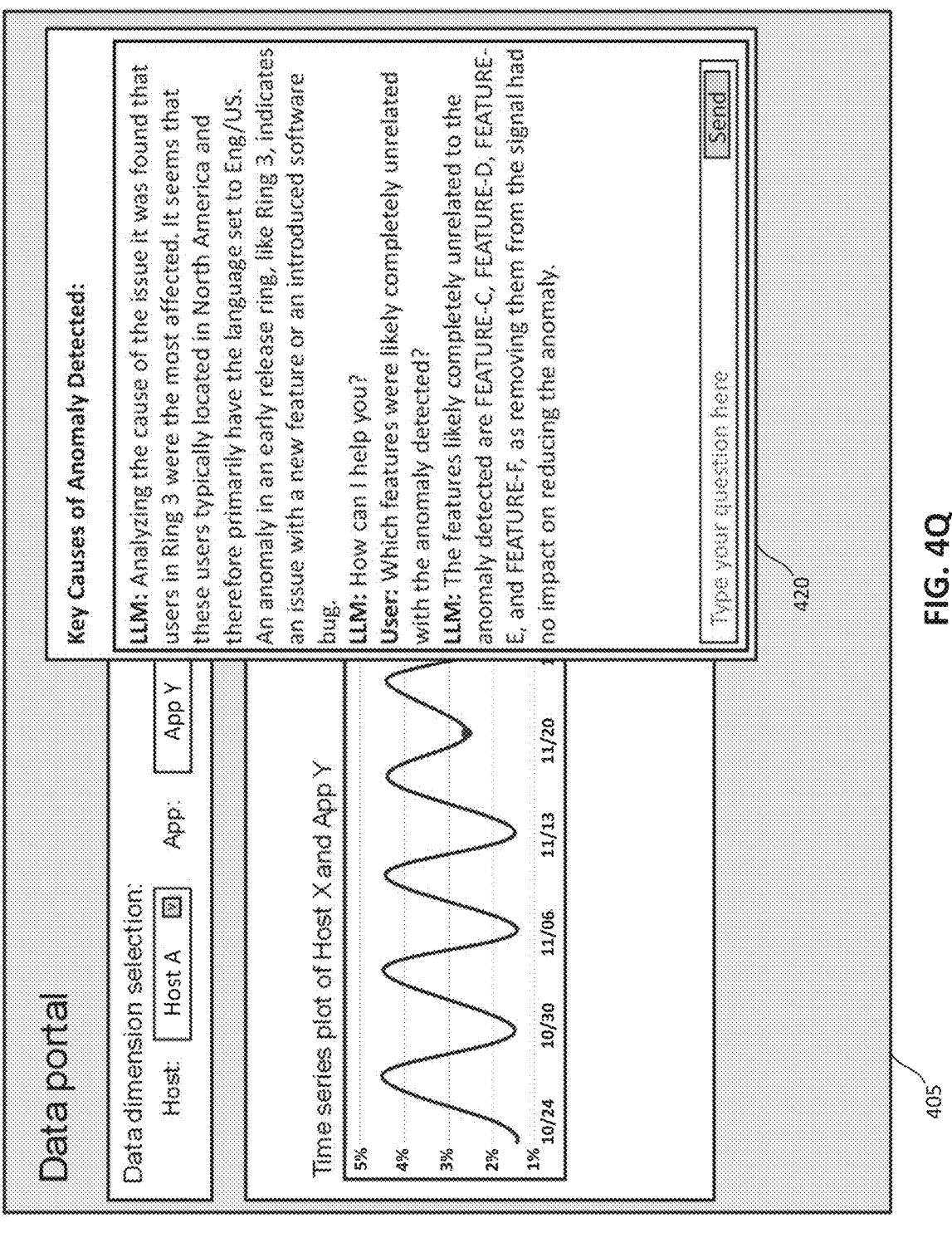

FIG. 4Q shows as example of the conversation interface being presented in the anomaly detail pane 420. The user can directly query the root cause analysis framework 140 for additional information in similar manner as the user interface shown in FIG. 4J. FIG. 4R shows an example of the prompts and outputs 450 used to generate the content of the conversation shown in FIG. 4Q.

FIG. 5A is a flow chart of another example process 500 for performing a root cause analysis according to the techniques disclosed herein. The process 500 can be implemented by the root cause analysis framework 140 discussed in the preceding examples.

The process 500 includes an operation 502 of analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system. The anomaly detection unit 202 of the root cause analysis framework 140 analyzes the signal data to identify anomalies.

The process 500 includes an operation 504 of analyzing each sub-signal of the first anomalous signal data using a data labeling unit of a root cause analysis framework to generate labeled training data, the labeled training data including an indication whether each sub-signal contributed to the first anomaly. The data labeling unit 304 of the root cause analysis unit 204 generates the labeled training data.

The process 500 includes an operation 506 of training a first machine learning model on the labeled training data using a model training unit of the root cause analysis framework, the first machine learning model being a gradient boosted decision tree model. As discussed in the preceding examples, the model training unit 306 trains the gradient boosted decision tree model 370 using the labeled training data output by the data labeling unit 304.

The process 500 includes an operation 508 of analyzing the first machine learning model using the model training unit to generate a decision tree approximating a predictive performance of the first machine learning model. The model training unit 306 generates the decision tree 372 from the gradient boosted decision tree model 370. A technical benefit of this approach is that the decision tree 372 can be utilized to provide insights into how the root cause analysis framework 140 makes the predictions of the type of anomaly that has occurred as well as the root cause of the anomaly. In contrast, current black box approaches can detect an anomaly in the timeseries signal data but cannot provide any insights into the root cause of the anomaly due to the opaque nature of such models.

The process 500 includes an operation 510 of determining first insights data predictive of a root cause of the first anomaly by performing a feature importance analysis of the first machine learning model, the first insights data being associated with a single factor contributing to the root cause of the first anomaly. The insight determination and processing unit 308 analyzes the gradient boosted decision tree model 370 to determine the single-level insights into the root cause of the anomaly.

The process 500 includes an operation 512 of determining second insights data predictive of the root cause of the first anomaly by parsing decision tree paths of the decision tree 372, the second insights data being associated with multiple factors contributing to the root cause. The insight determination and processing unit 308 determines the multi-level insights into the root cause of the anomaly based by paring the decision tree paths.

The process 500 includes an operation 514 of aggregating at least a portion of the first insights data and the second insights data into aggregated sub-signal data and an operation 516 of analyzing the aggregated sub-signal data using the anomaly detection unit to obtain second anomalous signal data. The insight determination and processing unit 308 aggregates the insight data from the sub-signals that appeared to have contributed to anomaly. The aggregated sub-signal data is provided as an input to the anomaly detection unit 202 for analysis, and the anomaly detection unit 202 outputs the second anomalous signal data.

The process 500 includes an operation 518 of analyzing the second anomalous signal data using the root cause analysis framework to determine a predicted root cause of the first anomaly and a confidence level associated with the predicted root cause. As discussed in the preceding examples, the insight determination and processing unit 308 determines the predicted root cause of the anomaly based on the aggregated signal. The aggregated signal was generated based on the sub-signals that appeared to include anomalies as discussed above.

The process 500 includes an operation 520 of categorizing the predicted root cause into a certainty category selected from among a plurality of certainty categories based on the confidence level associated with the predicted root cause. As discussed in the preceding examples, the insight determination and processing unit 308 determines the certainty category for the predicted root cause based on how certain the insight determination and processing unit 308 is of the predict root cause.

The process 500 includes an operation 522 of generating a visualization of the predicted root cause and the certainty category. The visualization can include textual content generated by the LLM 122 and/or graphical content generated by the one or more other generative models 124. The prompt construction unit 206 constructs prompts to the LLM 122 and/or the one or more other generative models 124 to cause the models to generate the content.

The process 500 includes an operation 522 of causing an application to present the visualization of the predicted root cause on a display of a client device. The application may be a data portal application that includes a user interface 405 similar to that shown in FIGS. 4A-4R. The visualization is shown in the anomaly detail pane 420 of the user interface 405 in these examples. As discussed in the preceding examples, the user interface 405 can be presented by the native application 114 on the client device 105 or the web application 190 accessed using the browser application 112 of the client device 105.

FIG. 5B is a flow chart of another example process 540 for performing a root cause analysis according to the techniques disclosed herein. The process 540 can be implemented by the native application 114 or the web application 190 discussed in the preceding examples.

The process 540 includes an operation 542 of receiving, in a user interface of a data portal application, an input requesting access to a timeseries signal data. The data portal application can be implemented by the native application 114 or the web application 190, and the data portal application can implement the user interface 405 shown in the preceding figures.

The process 540 includes an operation 544 of sending a request to a root cause analysis framework 140 to access the timeseries signal data based on the input and to analyze the timeseries signal data using an anomaly detection unit 202 to identify anomalies in the timeseries signal data. As discussed in the preceding examples, the anomaly detection unit 202 identifies anomalies in timeseries data signals that may be representative of a fault in hardware and/or software components of a computing system.

The process 540 includes an operation 546 of receiving a visualization data that includes a timeseries plot of the timeseries signal data and anomaly information identifying anomalies in the timeseries signal data. The visualization data can be generated by the anomaly detection unit 202 to provide the user with a visual representation of the timeseries signal data. In some implementations, the visualization data is generated by the native application 114 and/or the web application 190.

The process 540 includes an operation 548 of presenting the timeseries plot on a user interface 405 of the data portal application. The timeseries plot includes an anomaly indication for each anomaly in the timeseries signal data, such as the anomaly indication 417 show in FIG. 4B.

The process 540 includes an operation 550 of receiving a user input selecting a first anomaly indication associated with a first anomaly. As discussed with respect to FIG. 4C-4K, the user may click on or otherwise activate the anomaly indication 417 to cause the native application 114 and/or the web application 190 to display the anomaly detail pane 420.

The process 540 includes an operation 552 of sending a request to the root cause analysis pipeline for anomaly information for the first anomaly an operation 554 of receiving the anomaly information for the first anomaly from the root cause analysis pipeline, the anomaly information including a predicted root cause for the first anomaly and a confidence level associated with the predicted root cause. The native application 114 or the web application 190 sends a request to the root cause analysis framework 140 to request information about the anomaly. The root cause analysis unit 204 generates this information using the techniques discussed in the preceding examples.

The process 540 includes an operation 556 of presenting the anomaly information in an anomaly detail pane 420 of the user interface of the data portal application. Detailed information about the anomaly and the root cause of the anomaly determined by the root cause analysis unit 204 are presented in the anomaly detail pane 420 of the user interface 405.

FIG. 5C is a flow chart of another example process 570 for performing a root cause analysis according to the techniques disclosed herein. The process 570 can be implemented by the root cause analysis framework 140 discussed in the preceding examples.

The process 570 includes an operation 572 of analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system. The anomaly detection unit 202 of the root cause analysis framework 140 analyzes the signal data to identify anomalies.

The process 570 includes an operation 574 of analyzing the plurality of sub-signals of the anomalous signal data using a root cause analysis framework that trains a first machine learning model based on the first anomalous signal data and uses the model to generate a predicted root cause of the first anomaly, the first machine learning model being an interpretable model that facilitates understanding how the first machine learning model generates the predicted root cause. The root cause analysis framework 142 analyzes the anomalous signal data according to the techniques discussed in the preceding examples. A technical benefit of this approach is that the root cause analysis framework 142 utilizes an interpretable model that enables human users to understand how the model arrives at the predicted root causes. As a result of this interpretability, the root cause analysis framework 142 can generate insights into the predict root cause of anomalies as well as provide mitigating actions for addressing the root cause of these anomalies. These mitigating actions can include analyzing source code and/or configuration parameters and providing recommendations for corrected errors in the source code and/or the configuration parameters that are predicted to be at least a part of the root cause of an anomaly.

The process 570 includes an operation 576 of generating a visualization of the predicted root cause. The visualization can include textual content generated by the LLM 122 and/or graphical content generated by the one or more other generative models 124. The prompt construction unit 206 constructs prompts to the LLM 122 and/or the one or more other generative models 124 to cause the models to generate the content.

The process 570 includes an operation 578 of causing an application to present the visualization of the predicted root cause on a display of a client device. The application may be a data portal application that includes a user interface 405 similar to that shown in FIGS. 4A-4R. The visualization is shown in the anomaly detail pane 420 of the user interface 405 in these examples. As discussed in the preceding examples, the user interface 405 can be presented by the native application 114 on the client device 105 or the web application 190 accessed using the browser application 112 of the client device 105. The visualization includes both the anomalous signal and the component sub-signals that are anomalous in some implementations. In other implementations, the visualization may be user configurable, and the user may elect to be presented the original anomalous signal, the anomalous sub-signals, and/or the non-anomalous sub-signals. The anomaly detail pane 420 can include controls that enable the user to select which signal and/or sub-signal data to be presented in the visualization.

The detailed examples of systems, devices, and techniques described in connection with FIGS. 1-5C are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5C are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
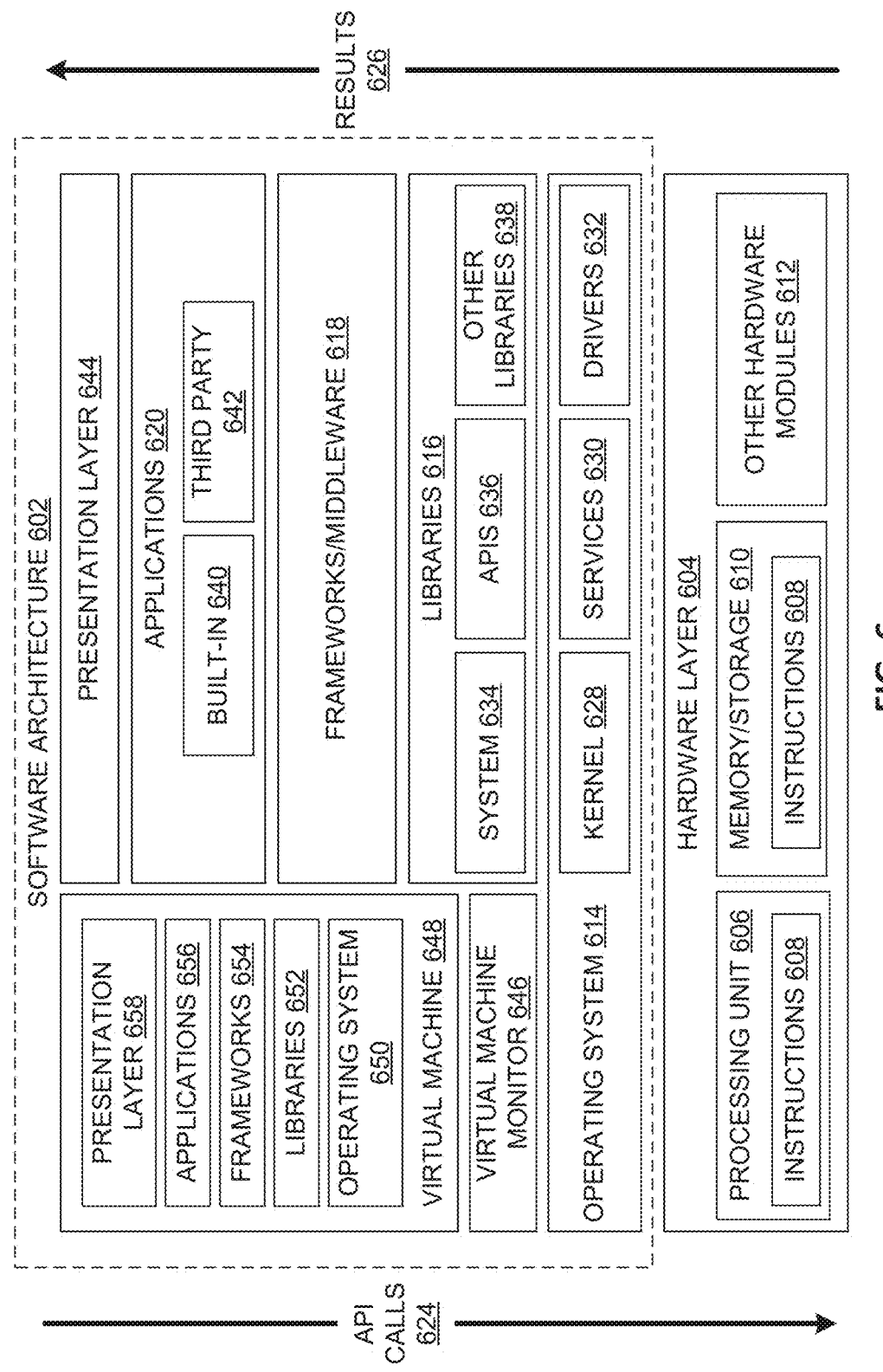
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks/middleware 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks/middleware 618 may provide various graphic user interface (GUI) functions, high-level resource management, or high-level location services. The frameworks/middleware 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks/middleware 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
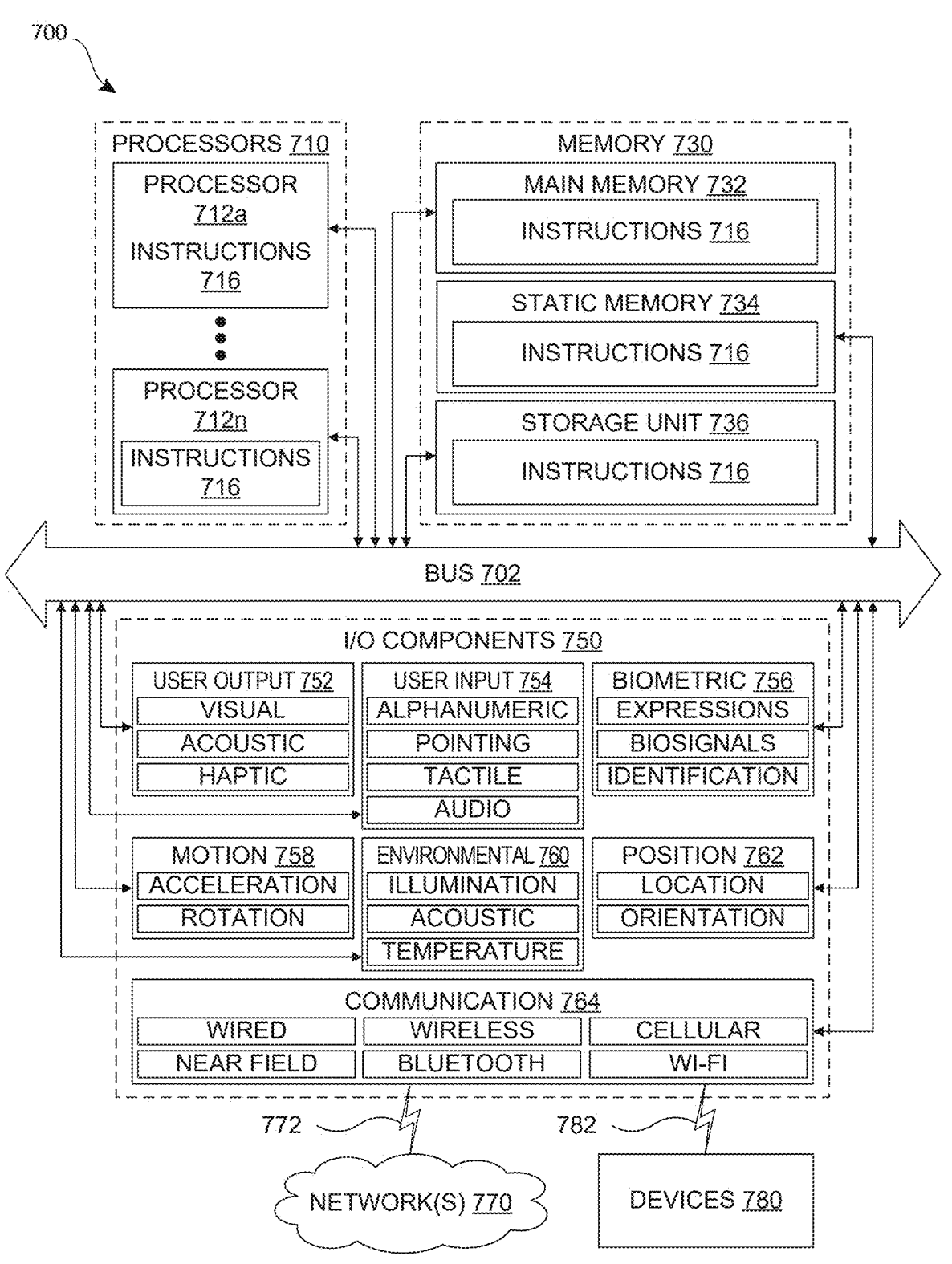
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory storing executable instructions that, when executed, cause the processor alone or in combination with other processors to perform operations of:
      analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system;

analyzing the plurality of sub-signals of the first anomalous signal data using a root cause analysis framework to generate a predicted root cause of the first anomaly by:

analyzing each sub-signal of the first anomalous signal data using a data labeling unit of a root cause analysis framework to generate labeled training data, the labeled training data including an indication whether each sub-signal contributed to the first anomaly;

training a first machine learning model using a model training unit of the root cause analysis framework, the model training unit being configured to train the first machine learning model as a gradient boosted decision tree model using gradient boosting;

reducing a complexity of the first machine learning model using ensemble-pruning to reduce computational resources utilized by the first machine learning model;

analyzing the first machine learning model using the model training unit to generate a decision tree based on a tree structure of the first machine learning model, the decision tree approximating a predictive performance of the first machine learning model; and determining the predicted root cause of the first anomaly using the decision tree;

analyzing the predicted root cause using a large language model to obtain one or more remedial measures for correcting the predicted root cause of the first anomaly, the one or more remedial measures comprising one or more actions of correcting an error in executable program code of a software component associated with the first anomaly and adjusting one or more configuration parameters associated with one or more software or one or more hardware components of the computing system;

generating a visualization of the predicted root cause and the one or more remedial measures; and causing an application to present the visualization of the predicted root cause and the one or more remedial measures on a display of a client device.

2. The data processing system of claim 1, wherein analyzing the first anomalous signal data using the root cause analysis framework further comprises:

determining first insights data predictive of a root cause of the first anomaly by performing a feature importance analysis of the first machine learning model, the first insights data being associated with a single factor contributing to the root cause of the first anomaly;

determining second insights data predictive of the root cause of the first anomaly by parsing decision tree paths of the decision tree, the second insights data being associated with multiple factors contributing to the root cause;

aggregating at least a portion of the first insights data and the second insights data into aggregated sub-signal data;

analyzing the aggregated sub-signal data using the anomaly detection unit to obtain second anomalous signal data;

analyzing the second anomalous signal data using the root cause analysis framework to determine a predicted root cause of the first anomaly and a confidence level associated with the predicted root cause; and categorizing the predicted root cause into a certainty category selected from among a plurality of certainty categories based on the confidence level associated with the predicted root cause.

3. The data processing system of claim 1, wherein analyzing each sub-signal of the first anomalous signal data using the data labeling unit of a root cause analysis framework to generate the labeled training data further comprises for a respective sub-signal:

analyzing the respective sub-signal to determine a quality level associated with the respective sub-signal;

analyzing the respective sub-signal based on the quality level associated with the respective sub-signal to determine whether the respective sub-signal contributed to the first anomaly based on the respective sub-signal satisfying a quality-level specific threshold; and generating the labeled training data for the respective sub-signal, the labeled training data including an indication whether the respective sub-signal contributed to the first anomaly based on the respective sub-signal satisfying a quality-level specific threshold.

4. The data processing system of claim 2, wherein categorizing the predicted root cause further comprises selecting the certainty category based on the second anomalous signal data satisfying a selection criterion associated with the certainty category.

5. The data processing system of claim 1, wherein the first machine learning model is an XGBoost model.

6. The data processing system of claim 5, wherein analyzing the first machine learning model to generate the decision tree further comprises generating the decision tree using an XGBoost tree approximator.

7. The data processing system of claim 2, wherein generating the visualization of the predicted root cause further comprises:

constructing a first prompt for a large language model (LLM) to cause the LLM to generate a description of the first anomaly, the predicted root cause, and the certainty category; and providing the first prompt to the LLM to cause the LLM to generate the description of the first anomaly, the predicted root cause, and the certainty category.

8. The data processing system of claim 7, wherein constructing the first prompt further comprises:

obtaining a persona indicator associated a user for whom the visualization is to be generated, wherein constructing the first prompt further comprises including a persona description in the first prompt based on the persona indicator, the persona description providing contextual information to the first prompt to customize the description for the user.

9. The data processing system of claim 8, wherein constructing the first prompt further comprises:

selecting a first prompt template from among a plurality of prompt templates based on one or both of the certainty category and the persona indicator; and constructing the first prompt based on the first prompt template.

10. The data processing system of claim 7, wherein the large language model is implemented using a Generative Pre-trained Transformer (GPT) model.

11. The data processing system of claim 1, wherein analyzing the first anomalous signal data using the root cause analysis framework further comprises generating one or more mitigating actions that can be performed to correct the first anomaly.

12. A method implemented in a data processing system for performing a root cause analysis, the method comprising:

analyzing signal data indicative of a performance of components of a computing system with an anomaly detection unit to obtain first anomalous signal data associated with a first anomaly detected in the signal data, the first anomalous signal data comprising a plurality of sub-signals, each sub-signal representing an aspect of the performance of the computing system;

analyzing the plurality of sub-signals of the first anomalous signal data using a root cause analysis framework to generate a predicted root cause of the first anomaly by:

analyzing each sub-signal of the first anomalous signal using a data labeling unit of a root cause analysis framework to generate labeled training data, the labeled training data including an indication whether each sub-signal contributed to the first anomaly;

training a first machine learning model using a model training unit of the root cause analysis framework, the model training unit being configured to train the first machine learning model as a gradient boosted decision tree model using gradient boosting;

reducing a complexity of the first machine learning model using ensemble-pruning to reduce computational resources utilized by the first machine learning model;

analyzing the first machine learning model using the model training unit to generate a decision tree based on a tree structure of the first machine learning model, the decision tree approximating a predictive performance of the first machine learning model; and determining the predicted root cause of the first anomaly using the decision tree;

analyzing the predicted root cause using a large language model to obtain one or more remedial measures for correcting the predicted root cause of the first anomaly, the one or more remedial measures comprising one or more actions of correcting an error in executable program code of a software component associated with the first anomaly and adjusting one or more configuration parameters associated with one or more software or one or more hardware components of the computing system;

generating a visualization of the predicted root cause and the one or more remedial measures; and causing an application to present the visualization of the predicted root cause and the one or more remedial measures on a display of a client device.

13. A data processing system comprising:

a processor; and a memory storing executable instructions that, when executed, cause the processor alone or in combination with other processors to perform operations of:

receiving, in a user interface of a data portal application, an input requesting access to a timeseries signal data;

sending a request to a root cause analysis framework to access the timeseries signal data based on the input and to analyze the timeseries signal data and to identify anomalies in the timeseries signal data by:

analyzing the timeseries signal data, the timeseries signal data being indicative of a performance of components of a computing system with an anomaly detection unit of the root cause analysis framework to obtain first anomalous signal data associated with a first anomaly detected in the timeseries signal data, the first anomalous signal data comprising a plurality of sub-signals, each sub-signal representing an aspect of the performance of the computing system, analyzing the plurality of sub-signals of the first anomalous signal data using a root cause analysis unit of the root cause analysis framework to generate a predicted root cause of the first anomaly by:

analyzing each sub-signal of the first anomalous signal data using a data labeling unit of a root cause analysis framework to generate labeled training data, the labeled training data including an indication whether each sub-signal contributed to the first anomaly;

training a first machine learning model using a model training unit of the root cause analysis framework, the model training unit being configured to train the first machine learning model as a gradient boosted decision tree model using gradient boosting;

reducing a complexity of the first machine learning model using ensemble-pruning to reduce computational resources utilized by the first machine learning model;

analyzing the first machine learning model using the model training unit to generate a decision tree based on a tree structure of the first machine learning model, the decision tree approximating a predictive performance of the first machine learning model; and determining the predicted root cause of the first anomaly using the decision tree;

analyzing the predicted root cause using a large language model to obtain one or more remedial measures for correcting the predicted root cause of the first anomaly, the one or more remedial measures comprising one or more actions of correcting an error in executable program code of a software component associated with the first anomaly and adjusting one or more configuration parameters associated with one or more software or one or more hardware components of the computing system; and generating visualization data providing a visual representation of the predicted root cause and the one or more remedial measures, the visualization data including a timeseries plot of the timeseries signal data and anomaly information identifying anomalies in the timeseries signal data;

receiving the visualization data from the root cause analysis framework;

presenting the visualization data including the timeseries plot on a user interface of the data portal application, the timeseries plot including an anomaly indication for each anomaly in the timeseries signal data;

US 12,645,524 B2

31 receiving a user input selecting a first anomaly indication associated with a first anomaly;

sending a request to the root cause analysis framework for anomaly information for the first anomaly;

receiving the anomaly information for the first anomaly from the root cause analysis framework, the anomaly information including a predicted root cause for the first anomaly and a confidence level associated with the predicted root cause; and presenting the anomaly information in an anomaly detail pane of the user interface of the data portal application.

14. The data processing system of claim 13, wherein the anomaly detail pane includes a link, which when activated, causes the data portal application to request additional information regarding a root cause of the first anomaly from a root cause analysis framework.

15. The data processing system of claim 13, wherein the memory further includes instructions configured to cause the processor alone or in combination with other processors to perform operations of:

presenting a conversation interface pane in the user interface of the data portal application, the conversation interface pane providing an input for natural language prompts to query a root cause analysis framework;

receiving a first natural language prompt as an input, the first natural language prompt requesting additional information from the root cause analysis framework;

sending the first natural language prompt to the root cause analysis framework to be executed by a large language model;

receiving a response from the root cause analysis framework that includes the additional information; and presenting the response in the conversation interface pane.

16. The data processing system of claim 13, wherein the anomaly information includes a visualization of a primary cause of the first anomaly, the visualization being generated by the root cause analysis framework using a generative machine learning model trained to generate the visualization based on sub-signal data associated with the first anomaly obtained from the timeseries signal data.

17. The data processing system of claim 13, wherein the memory further includes instructions configured to cause the processor alone or in combination with other processors to perform operations of:

obtaining a persona indicator that has been input in the user interface of the data portal application, the persona indicator indicating a type of user for which the anomaly information is to be customized; and sending the persona indicator to the root cause analysis framework to cause the root cause analysis framework to customize the anomaly information according to the type of user associated with the persona indicator.

* * * * *